United States Patent
Kawahara et al.

(10) Patent No.: US 9,233,429 B2
(45) Date of Patent: Jan. 12, 2016

(54) WIRE-CUT ELECTRIC DISCHARGE MACHINE HAVING FUNCTION OF DETECTING UPPER SURFACE OF WORKPIECE

(75) Inventors: Akiyoshi Kawahara, Yamanashi (JP); Hiroyuki Furukawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 343 days.

(21) Appl. No.: 13/288,272

(22) Filed: Nov. 3, 2011

(65) Prior Publication Data

US 2012/0223055 A1  Sep. 6, 2012

(30) Foreign Application Priority Data

Mar. 3, 2011 (JP) ................................. 2011-046047

(51) Int. Cl.
*B23K 9/00* (2006.01)
*B23H 7/00* (2006.01)
*B23H 7/06* (2006.01)
*B23H 7/20* (2006.01)

(52) U.S. Cl.
CPC .................. *B23H 7/065* (2013.01); *B23H 7/20* (2013.01); *B23H 2500/20* (2013.01)

(58) Field of Classification Search
CPC ............ B23H 7/065; B23H 7/06; B23H 7/20; B23H 2500/20; B23H 7/04; B23H 1/00; B23H 11/003; G05B 19/4086; G05B 2219/33263
USPC .......... 219/69.12, 69.13, 69.14, 69.15, 69.16, 219/69.17, 69.18, 69.19, 69.2
See application file for complete search history.

(56) References Cited

U.S. PATENT DOCUMENTS

| | | | | |
|---|---|---|---|---|
| 4,329,558 A * | 5/1982 | Martin | ....................... | 219/69.12 |
| 4,431,894 A * | 2/1984 | Inoue | ......................... | 219/69.12 |
| 4,495,393 A * | 1/1985 | Janicke | ...................... | 219/69.17 |
| 4,499,359 A * | 2/1985 | Obara | ........................ | 219/69.12 |

(Continued)

FOREIGN PATENT DOCUMENTS

| EP | 1522364 A2 | 4/2005 |
|---|---|---|
| JP | 55101331 A | 8/1980 |

(Continued)

OTHER PUBLICATIONS

Office Action corresponding to JP 2011-046047, dated Jan. 31, 2012.

(Continued)

*Primary Examiner* — Eric Stapleton
(74) *Attorney, Agent, or Firm* — Hauptman Ham, LLP

(57) ABSTRACT

Upper and lower wire guides in a wire-cut electric discharge machine are moved until a wire electrode contacts with a workpiece, and after the contact, the upper and lower wire guides are moved backward to a position A which is away from the contact point at a fixed distance. Then, the upper wire guide is moved until the wire electrode contacts with the workpiece and the upper wire guide is returned to the position A. Subsequently, the lower wire guide is moved until the wire electrode contacts with the workpiece and the lower wide guide is returned to the position A. A coordinate value on the position where the wire electrode contacts with the workpiece is calculated by using position detection values which are obtained in the above respective steps, and board thickness is calculated from the coordinate value.

3 Claims, 15 Drawing Sheets

(56) References Cited

U.S. PATENT DOCUMENTS

| | | | | |
|---|---|---|---|---|
| 4,520,253 A * | 5/1985 | Gamo et al. | ............... | 219/69.12 |
| 4,521,662 A * | 6/1985 | Kinoshita et al. | .......... | 219/69.12 |
| 4,546,227 A * | 10/1985 | Gamo et al. | ............... | 219/69.17 |
| 4,559,601 A * | 12/1985 | Kishi et al. | .................... | 700/187 |
| 4,598,189 A * | 7/1986 | Inoue et al. | ................ | 219/69.12 |
| 4,622,450 A * | 11/1986 | Kinoshita et al. | .......... | 219/69.12 |
| 4,652,717 A * | 3/1987 | Briffod et al. | .............. | 219/69.12 |
| 4,673,788 A * | 6/1987 | Buchler | ..................... | 219/69.12 |
| 4,675,491 A * | 6/1987 | Marendaz | ................. | 219/69.12 |
| 4,703,146 A * | 10/1987 | Kinoshita | .................. | 219/69.12 |
| 4,713,517 A * | 12/1987 | Kinoshita | .................. | 219/69.12 |
| 4,736,086 A * | 4/1988 | Obara | ........................ | 219/69.12 |
| 4,777,340 A * | 10/1988 | Kobayashi et al. | ........ | 219/69.12 |
| 4,783,583 A * | 11/1988 | Obara et al. | .............. | 219/69.12 |
| 4,801,779 A * | 1/1989 | Obara | ........................ | 219/69.12 |
| 4,806,720 A * | 2/1989 | Obara | ........................ | 219/69.12 |
| 4,814,572 A * | 3/1989 | Aso et al. | ................... | 219/69.12 |
| 4,816,636 A * | 3/1989 | Obara et al. | .............. | 219/69.12 |
| 4,818,848 A * | 4/1989 | Obara et al. | .............. | 219/69.12 |
| 4,877,935 A * | 10/1989 | Aso et al. | ................... | 219/69.12 |
| 4,929,810 A * | 5/1990 | Kawase | ..................... | 219/69.12 |
| 4,931,614 A * | 6/1990 | Sumita | ...................... | 219/69.12 |
| 4,963,711 A * | 10/1990 | Obara | ........................ | 219/69.12 |
| 4,978,828 A * | 12/1990 | Umetsu et al. | ............. | 219/69.12 |
| 4,985,608 A * | 1/1991 | Morishita et al. | .......... | 219/69.12 |
| 5,001,321 A * | 3/1991 | Iwasaki et al. | ............. | 219/69.12 |
| 5,003,147 A * | 3/1991 | Kawanabe et al. | ........ | 219/69.12 |
| 5,006,691 A * | 4/1991 | Nakayama | ................. | 219/69.12 |
| 5,006,692 A * | 4/1991 | Magara et al. | ............. | 219/69.12 |
| 5,019,684 A * | 5/1991 | Ito | ............................... | 219/69.12 |
| 5,045,662 A * | 9/1991 | Yamada | ..................... | 219/69.12 |
| 5,051,553 A * | 9/1991 | Kinoshita | .................. | 219/69.12 |
| 5,055,649 A * | 10/1991 | Iwasaki et al. | ............. | 219/69.12 |
| 5,113,051 A * | 5/1992 | Sakaue | ...................... | 219/69.12 |
| 5,118,914 A * | 6/1992 | Girardin et al. | ............ | 219/69.11 |
| 5,142,116 A * | 8/1992 | Yokomichi et al. | ........ | 219/69.12 |
| 5,200,906 A * | 4/1993 | Yamashita et al. | ............ | 700/162 |
| 5,237,145 A * | 8/1993 | Magara et al. | ............. | 219/69.12 |
| 5,268,552 A * | 12/1993 | Onzuka et al. | ............. | 219/69.12 |
| 5,306,888 A * | 4/1994 | Kaneko et al. | ............. | 219/69.12 |
| 5,306,889 A * | 4/1994 | Kaneko et al. | ............. | 219/69.12 |
| 5,338,912 A * | 8/1994 | Iwasaki et al. | ............. | 219/69.12 |
| 5,506,381 A * | 4/1996 | Matsushima et al. | ...... | 219/69.12 |
| 5,519,181 A * | 5/1996 | Hsu | ............................ | 219/69.12 |
| 5,556,551 A * | 9/1996 | Matsushima et al. | ...... | 219/69.12 |
| 5,556,554 A * | 9/1996 | Morishita | .................. | 219/69.12 |
| 5,744,775 A * | 4/1998 | Yasuda et al. | .............. | 219/69.12 |
| 5,834,726 A * | 11/1998 | Drouet | ....................... | 219/69.12 |
| 5,852,269 A * | 12/1998 | Toyonaga et al. | .......... | 219/69.12 |
| 5,922,220 A * | 7/1999 | Beltrami et al. | ........... | 219/69.12 |
| 6,008,461 A * | 12/1999 | Iezawa et al. | .............. | 219/69.12 |
| 6,140,600 A * | 10/2000 | Kaneko et al. | ............. | 219/69.13 |
| 6,612,043 B2 * | 9/2003 | Tsai et al. | ....................... | 33/502 |
| 6,747,237 B2 * | 6/2004 | Arakawa | .................... | 219/69.12 |
| 6,787,727 B2 * | 9/2004 | Yamada et al. | ............. | 219/69.12 |
| 6,836,741 B2 * | 12/2004 | Liang et al. | ................... | 702/95 |
| 6,921,876 B2 * | 7/2005 | Okuda et al. | .............. | 219/69.12 |
| 6,984,800 B2 * | 1/2006 | Abe et al. | ................... | 219/69.12 |
| 7,054,712 B2 * | 5/2006 | Murai et al. | .................. | 700/162 |
| 7,113,884 B1 * | 9/2006 | Yuzawa et al. | ................ | 702/150 |
| 7,211,762 B2 * | 5/2007 | Kinoshita | .................. | 219/69.12 |
| 7,294,806 B2 * | 11/2007 | Martin et al. | .............. | 219/69.12 |
| 7,852,031 B2 * | 12/2010 | Hon et al. | ..................... | 318/572 |
| 7,919,721 B2 * | 4/2011 | Hayashi | ..................... | 219/69.12 |
| 2002/0184777 A1 | 12/2002 | Tsai et al. | | |
| 2003/0010753 A1* | 1/2003 | Yamada et al. | ............. | 219/69.12 |
| 2003/0042228 A1* | 3/2003 | Arakawa | .................... | 219/69.12 |
| 2004/0238498 A1* | 12/2004 | Okuda et al. | .............. | 219/69.12 |
| 2005/0072760 A1* | 4/2005 | Abe et al. | ................... | 219/69.12 |
| 2006/0102596 A1* | 5/2006 | Kinoshita et al. | .......... | 219/69.12 |
| 2006/0219667 A1* | 10/2006 | Martin et al. | .............. | 219/69.12 |
| 2008/0047936 A1* | 2/2008 | Hayashi | ..................... | 219/69.12 |
| 2012/0312786 A1* | 12/2012 | Arakawa et al. | ........... | 219/69.11 |

FOREIGN PATENT DOCUMENTS

| | | |
|---|---|---|
| JP | 59232731 A | 12/1984 |
| JP | 61236428 A | 10/1986 |
| JP | 3113725 U | 11/1991 |
| JP | 7-299660 A | 11/1995 |
| JP | 2003-071636 A | 3/2003 |
| JP | 2005-111608 A | 4/2005 |
| JP | 2008030139 A | 2/2008 |
| JP | 2008044033 A | 2/2008 |

OTHER PUBLICATIONS

International Search Report issued by the European Patent Office on Nov. 7, 2012 in corresponding EP Application No. 11186794.1.

* cited by examiner

WIRE-CUT ELECTRIC DISCHARGE MACHINE HAVING FUNCTION OF DETECTING UPPER SURFACE OF WORKPIECE

RELATED APPLICATIONS

The present application is based on, and claims priority from, Japanese Application Number 2011-046047, filed Mar. 3, 2011, the disclosure of which is hereby incorporated by reference herein in its entirety.

BACKGROUND OF THE INVENTION

1. Field of the Invention

The present invention relates to a wire-cut electric discharge machine which has a function of detecting upper and lower surfaces of a workpiece when machining the workpiece.

2. Description of the Related Art

A wire-cut electric discharge machine applies a voltage between poles of a wire electrode and a workpiece to generate electric discharge and at the same time, changes relative positions of the wire electrode to the workpiece, thus machining the workpiece in a desired form.

Concerning a machining result of a workpiece, dimensional accuracy, verticality, and angle accuracy are commonly required. In order to obtain a desired machining result, it is necessary to accurately obtain relative positions of a wire electrode to a workpiece. These relative positions are accurately obtained on the basis of a relationship of relative vertical positions of the wire electrode to the workpiece. In order to solve the issue of securing the relationship of relative vertical positions, Japanese Patent Application Laid-Open No. 2003-71636 discloses such technique that a wire electrode is brought into contact with an adjusting jig having a contact piece which is mounted on a workpiece mounting table, so as to adjust a vertical position of the wire electrode.

In the technique disclosed in Japanese Patent Application Laid-Open No. 2003-71636 mentioned above, it is necessary to set a machining condition after the vertical position of the wire electrode is adjusted. The machining condition commonly varies depending on a type and a diameter of a wire electrode and a material and a thickness of a workpiece, and a machining condition appropriate for machining a certain workpiece is stored in a numerical controller.

Associated with storing the machining condition in the numerical controller, a gap interval between a nozzle for guiding machining fluid to a discharging part and a workpiece needs to be set. In prior art technique, adjustment of a gap between an end of a nozzle and a workpiece has been manually performed.

In order to manually set a size of a gap between the end of the nozzle and the workpiece, such complicated operation is performed that an operator performs adjustment little by little by lowering a Z axis (vertical axis) in a running direction of a wire electrode little by little so that the gap has a designated fine value, while checking the gap with equipment such as a thickness gauge.

A machining condition of a wire-cut electric discharge machine varies depending on the thickness of a workpiece, so that an operator usually recognizes the thickness of the workpiece. Therefore, in a case where a workpiece is directly mounted on a workpiece placing table, it can be considered that a nozzle level can be automatically adjusted to correspond to the thickness of the workpiece.

Japanese Patent Application Laid-Open No. 7-299660 discloses such technique that a contact piece which is provided to an end of a nozzle is separated from a workpiece by a predetermined distance from a detected state where the contact piece and the workpiece contact with each other, so as to keep a distance between the nozzle and the workpiece at the predetermined distance. Further, Japanese Patent Application Laid-Open No. 2005-111608 discloses such technique that an end of a wire electrode is directly brought into contact with a workpiece so as to detect an upper surface position of the workpiece.

In the wire-cut electric discharge machine, a workpiece is machined by electric discharge and at the same time, fine particles of the workpiece generated by the electric discharge are dispersed in machining fluid. If these fine particles float around the wire electrode, electric discharge is generated between the wire electrode and the fine particles. Accordingly, electric discharge between the wire electrode and the workpiece, which is required for machining a shape, is reduced, generating such problem that machining speed is reduced.

In order to prevent the reduction of the machining speed due to such fine particles of the workpiece, it is necessary to remove fine particles around the wire electrode on a machining path so as to efficiently discharge to the workpiece, in the wire-cut electric discharge machine.

Commonly, a diameter of a wire electrode is very small, for example, approximately a few hundred μm, and a width of a machining groove which is formed by electric discharge is approximately a little larger than the diameter of the wire electrode. In order to effectively remove fine particles from such thin machining groove, it is necessary to increase pressure of sprayed water, so that a gap between the nozzle end and the workpiece needs to be decreased.

Even if an operator who performs machining of a workpiece with the wire-cut electric discharge machine recognizes the thickness of a workpiece, the thickness of the workpiece which is commonly used usually includes a dimensional error of approximately 100 μm to 200 μm. On the other hand, concerning adjustment of a gap between a nozzle end and a workpiece, it is sometimes required that the gap should be adjusted to be 100 μm to 200 μm depending on a machining condition. Therefore, it is impractical to automatically adjust a nozzle gap only depending on information of the thickness of a workpiece.

In the technique disclosed in Japanese Patent Application Laid-Open No. 7-299660, in order to detect contact of the nozzle end and the workpiece, a driving device for vertically driving a sensor and a nozzle and a control device which controls contact and isolation of the nozzle end and the workpiece are required to be provided. As a result, there are such problems that the wire-cut electric discharge machine becomes complicated and its cost is increased.

Further, in the technique disclosed in Japanese Patent Application Laid-Open No. 2005-111608, the wire electrode needs to be melt-cut or to be cut by an edged tool such as a cutter. In a case where the wire electrode is melt-cut, the diameter of an end of the wire electrode becomes thinner and sharper than a diameter of other part. Accordingly, when this end is brought into contact with an upper surface of the workpiece, the end part of the wire electrode is easily deformed. Therefore, it is difficult to accurately detect a position of the upper surface of the workpiece by using the technique disclosed in Japanese Patent Application Laid-Open No. 2005-111608. Further, in a case where the wire electrode is cut by an edged tool, the end part of the wire electrode is bent by the edged tool. In addition, in the case where the wire electrode is melt-cut, straightness of the wire electrode is improved by heating the wire electrode. However, in the case where the wire electrode is cut by an edged tool, the straightness of the wire electrode is not improved. Consequently, there is a problem that the position of the upper surface of the workpiece cannot be accurately detected in the same way as the case where the wire electrode is melt-cut.

SUMMARY OF THE INVENTION

An object of the present invention is to provide a wire-cut electric discharge machine having a function of accurately detecting a position of an upper surface or a lower surface of a workpiece or positions of the both surfaces of the workpiece by relatively moving upper and lower wire guides with respect to the workpiece and bringing a wire electrode into contact with the workpiece.

A wire-cut electric discharge machine according to the present invention has a function of detecting an upper surface of a workpiece and includes a mechanism configured to relatively move a wire electrode that is stretched between upper and lower wire guides embedded in upper and lower nozzles with respect to a workpiece that is placed on a workpiece placing table. The wire-cut electric discharge machine comprises a contact detection unit configured to detect contact between the wire electrode and the workpiece, a movement control unit that relatively moves the wire electrode that is stretched between the upper and lower wire guides with respect to the workpiece after positioning the upper and lower wire guides so that the wire electrode becomes orthogonal to a horizontal surface, then stops the relative movement of the upper and lower wire guides with respect to the workpiece at a first position where contact between the wire electrode and the workpiece is detected, subsequently, relatively moves the upper and lower wire guides with respect to the workpiece, then stops the relative movement of the upper and lower wire guides with respect to the workpiece at a second position that is away from an end surface of the workpiece by a predetermined distance, subsequently, relatively moves the upper wire guide with respect to the workpiece in a state where the lower wire guide is not relatively moved, and then stops the relative movement of the upper wire guide with respect to the workpiece at a third position where the contact between the wire electrode and the workpiece is detected, a storage unit configured to store positions of the upper and lower wire guides obtained when the relative movement is stopped on the first position, the second position, and the third position, a wire electrode inclination angle calculating unit configured to calculate an inclination angle of the wire electrode lying at the third position from a relative distance in a horizontal direction of the upper wire guide obtained when the relative position of the upper wire guide with respect to the workpiece is changed from the second position to the third position and a distance in a vertical direction of the upper and lower wire guides, and a workpiece upper surface position calculating unit configured to calculate a distance from the lower wire guide to the upper surface of the workpiece based on the inclination angle of the wire electrode lying at the third position and a distance in a horizontal direction between the lower wire guide and the end surface of the workpiece lying at the third position.

The movement control unit may relatively move the lower wire guide with respect to the workpiece in a state where the upper wire guide is not relatively moved after positioning the upper and lower wire guides on the second position, and stop the relative movement of the lower wire guide with respect to the workpiece at a fourth position where contact between the wire electrode and the workpiece is detected, the storage unit may store the position of the lower wire guide lying at the fourth position, and the wire electrode inclination angle calculating unit may calculate an inclination angle of the wire electrode lying at the fourth position from a relative distance in the horizontal direction obtained when the relative position of the lower wire guide with respect to the workpiece is changed from the second position to the fourth position and a distance in a vertical direction of the upper and lower wire guides. The wire-cut electric discharge machine may further comprises a workpiece lower surface position calculating unit configured to obtain a height from the lower wire guide to a lower surface of the workpiece based on an inclination angle of the wire electrode lying at the fourth position and a distance in a horizontal direction between the lower wire guide lying at the fourth position and the end surface of the workpiece, and a board thickness calculating unit configured to calculate board thickness of the workpiece from a height from the lower wire guide to the upper surface of the workpiece and a height from the lower wire guide to the lower surface of the workpiece.

The wire-cut electric discharge machine may further comprise an upper nozzle positioning unit configured to position the upper nozzle so that a distance between the upper nozzle and the upper surface of the workpiece becomes a predetermined distance.

According to the present invention, a wire-cut electric discharge machine that has a function of accurately detecting a position of an upper surface or a lower surface of a workpiece or positions of both of the upper and lower surfaces by relatively moving upper and lower wire guides and the workpiece and bringing a wire electrode into contact with the workpiece.

BRIEF DESCRIPTION OF THE DRAWINGS

Above-mentioned and other objects and features of the present invention will be apparent from the following embodiment described with reference to the accompanying drawings, in which.

DETAILED DESCRIPTION OF THE PREFERRED EMBODIMENTS

Figure 1:
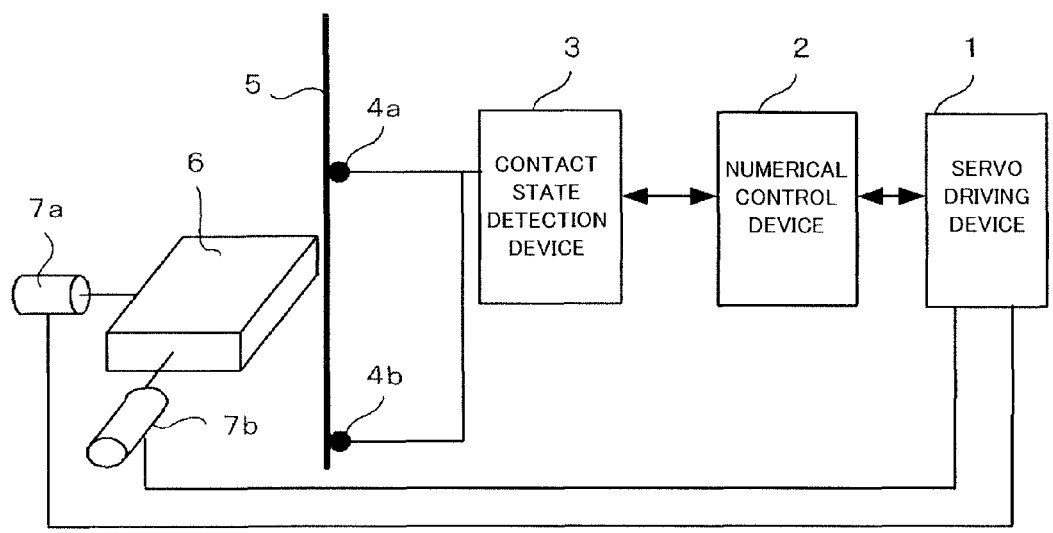
FIG. 1 is a schematic configuration diagram of a wire-cut electric discharge machine.

FIG. 1 is a schematic configuration diagram showing a wire-cut electric discharge machine having a function of detecting a position of a wire electrode 5 according to the present invention.

The wire-cut electric discharge machine shown in FIG. 1 includes a servo driving device 1, a numerical controller 2, and a contact state detection device 3. The servo driving device 1 drives servo motors 7a and 7b in accordance with a command from the numerical controller 2 so as to relatively move a workpiece 6 which is placed on a workpiece placing table (not shown) with respect to the wire electrode 5. The contact state detection device 3 detects contact of the wire electrode 5 and the workpiece 6 by using contact state detection pieces 4a and 4b. Here, the servo driving device 1, the numerical controller 2, and the contact state detection device 3 will be described later with reference to FIG. 28.

Figure 2A:
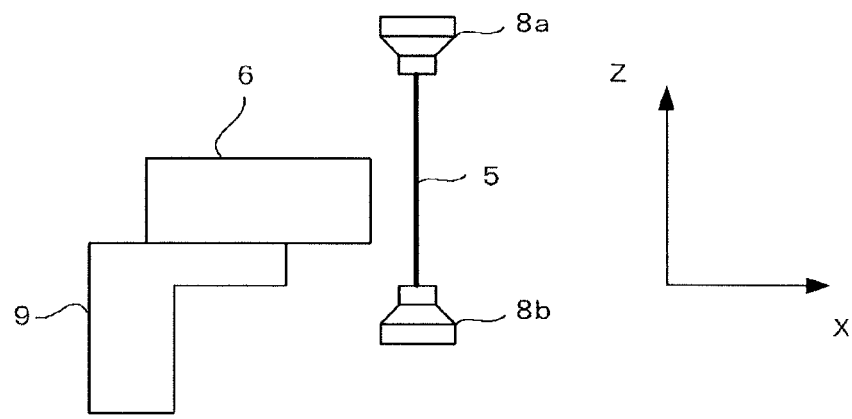
FIG. 2A is a schematic configuration diagram of a wire electrode and a workpiece of a wire-cut electric discharge machine having a function of detecting a position of the wire electrode and FIG. 2B is a schematic view of the workpiece.
Figure 2B:
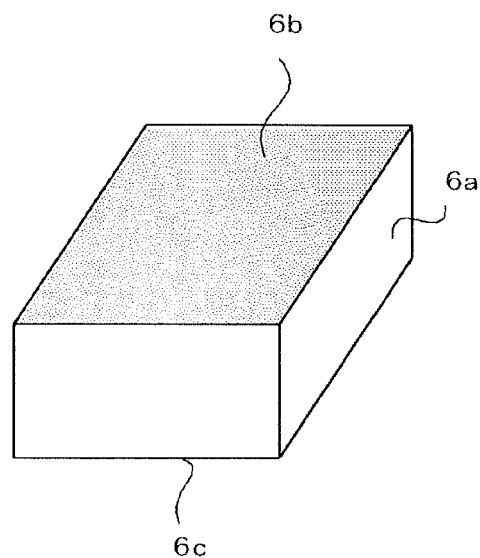
Figure 3:
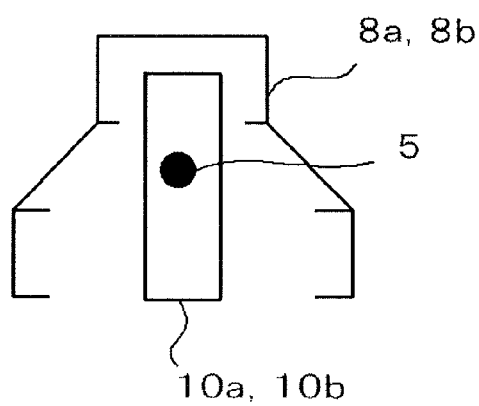
FIG. 3 illustrates a positional relationship between the wire electrode and the workpiece and illustrates that upper and lower nozzles in which wire guides are embedded.

A positional relationship between the workpiece 6 placed on a workpiece placing table 9 and the wire electrode 5 stretched between upper and lower nozzles 8a and 8b is shown in FIG. 2A. The wire electrode 5 is not directly supported by the upper and lower nozzles 8a and 8b, but is supported by wire guides 10a and 10b which are embedded in the upper and lower nozzles 8a and 8b as shown in FIG. 3. Here, the workpiece 6 has an end surface (lateral surface) 6a, an upper plane surface 6b, and a lower plane surface 6c as shown in FIG. 2B.

A method for detecting the upper plane surface 6b and the lower plane surface 6c of the workpiece 6 by using a wire-cut electric discharge machine including the contact state detection device 3 is described below.

Figure 4:
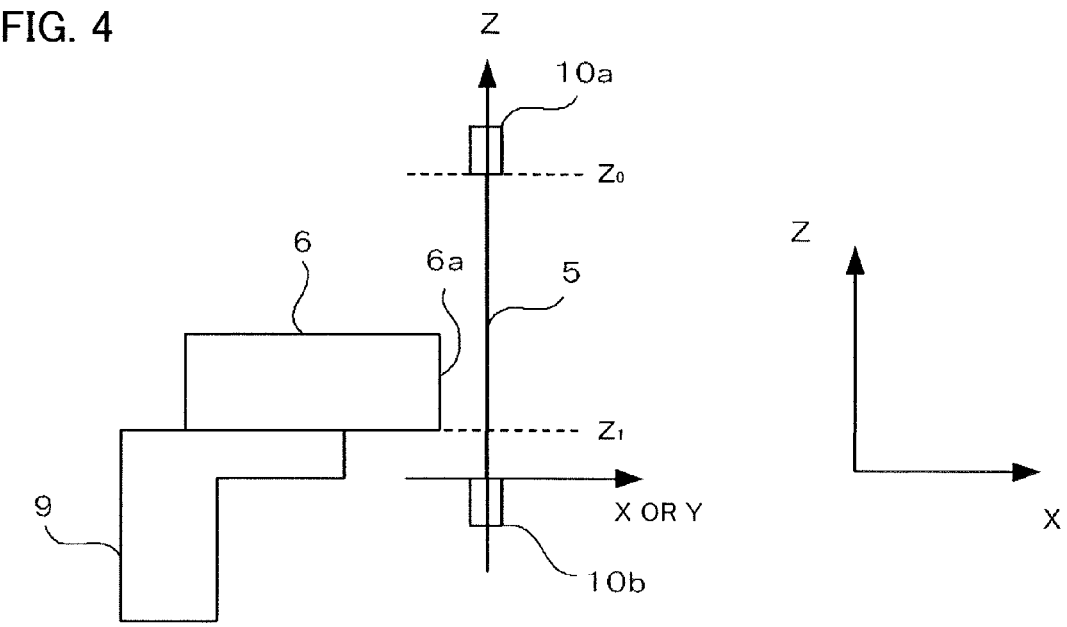
FIG. 4 illustrates that an upper wire guide and a lower wire guide which support the wire electrode are preliminarily adjusted to be placed in a vertical alignment before positions of an upper plane surface and a lower plane surface of the workpiece are detected.

FIG. 4 illustrates that the upper wire guide 10a and the lower wire guide 10b which support the wire electrode 5 are preliminarily adjusted to be arranged in a vertical alignment before positions of the upper plane surface and the lower plane surface of the workpiece are detected.

The workpiece 6 is placed on the workpiece placing table 9. Before the upper and lower plane surfaces 6b and 6c of the workpiece 6 are detected, positions of the upper and lower wire guides 10a and 10b which support the wire electrode 5 are preliminarily adjusted so that the wire electrode 5 is stretched in a vertical direction. The end surface (lateral surface) 6a of the workpiece 6 becomes parallel to the wire electrode 5. Here, a height direction in a case where the position of the lower wire guide 10b is set as a reference is defined as Z-axis direction. A direction which is orthogonal to the Z axis and is a right-left direction of an elevation view of FIG. 4 is defined as X-axis direction. A direction which is orthogonal to both of the Z axis and the X axis is defined as Y-axis direction. That is, an X, Y, Z coordinate system of which the origin is the position of the lower wire guide 10b is set.

Accordingly, movement in the horizontal direction of the wire-cut electric discharge machine is movement in the X-axis direction or in the Y-axis direction. However, the movement in the horizontal direction of the wire-cut electric discharge machine is described below by using the movement in the X-axis direction.

Concerning the movement in the Z-axis direction (vertical direction) of the wire-cut electric discharge machine, the upper wire guide 10a can actually be driven downward up to the level shown by a reference character $Z_1$ in FIG. 4. Further, the height of an upward driving limit in the Z-axis direction is defined as a position shown by a reference character $Z_0$ in FIG. 4. A supporting portion (not shown) of the lower wire guide 10b does not have any movable portion and $Z_0$ constantly has a fixed value.

Relative position and posture of the wire electrode 5 to the workpiece 6 can be changed by a combination of moving the workpiece placing table 9, on which the workpiece 6 is placed, in the X-axis direction and the Y-axis direction and moving the upper wire guide 10a in U-axis direction and V-axis direction.

Figure 5:
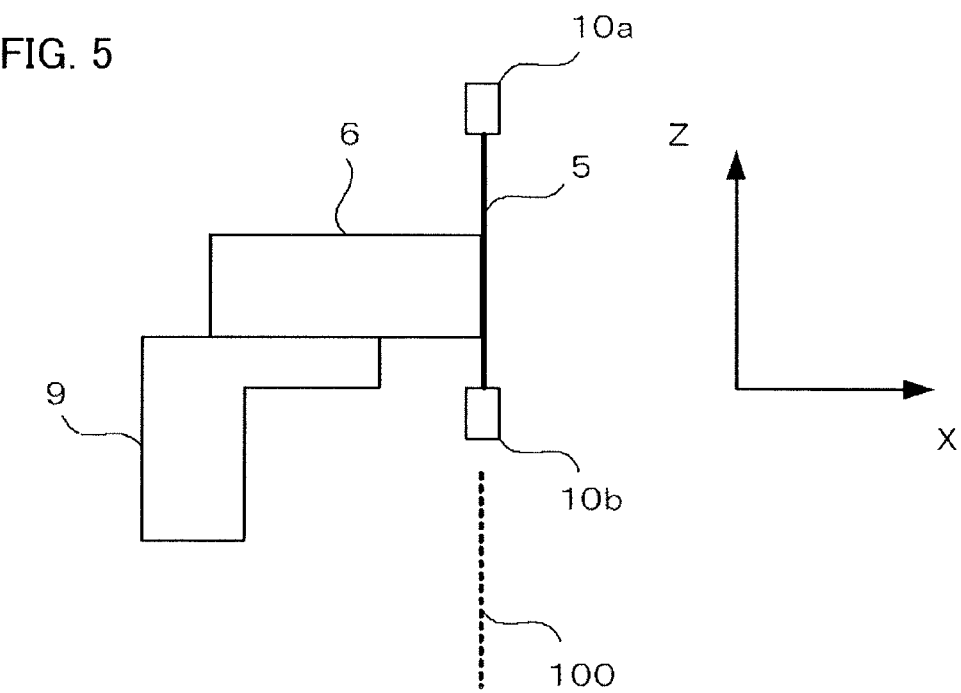
FIG. 5 illustrates that a position of an end surface of the workpiece is detected by bringing the wire electrode into contact with the workpiece.

FIG. 5 illustrates that a position of the end surface 6a is detected by bringing the wire electrode 5 into contact with the workpiece 6.

The end surface 6a of the workpiece 6 is first detected by bringing the wire electrode 5 into contact with the workpiece 6. As shown in FIG. 5, the upper wire guide 10a and the lower wire guide 10b are brought closer to the workpiece 6 while keeping a state where those upper and lower wire guides 10*a* and 10*b* are arranged in a vertical alignment. Then, positions of the upper and lower wire guides 10*a* and 10*b* at a time when the wire electrode 5 supported by those upper wire guide 10*a* and the lower wire guide 10*b* contacts with the workpiece 6 are detected and the detecting results are stored in a storage unit included in the numerical controller 2. Here, contact between the wire electrode 5 and the workpiece 6 may be realized by bringing the wire electrode 5 closer to the workpiece 6 or by bringing the workpiece 6 closer to the wire electrode 5, depending on the mechanical configuration of the wire-cut electric discharge machine.

Figure 6:
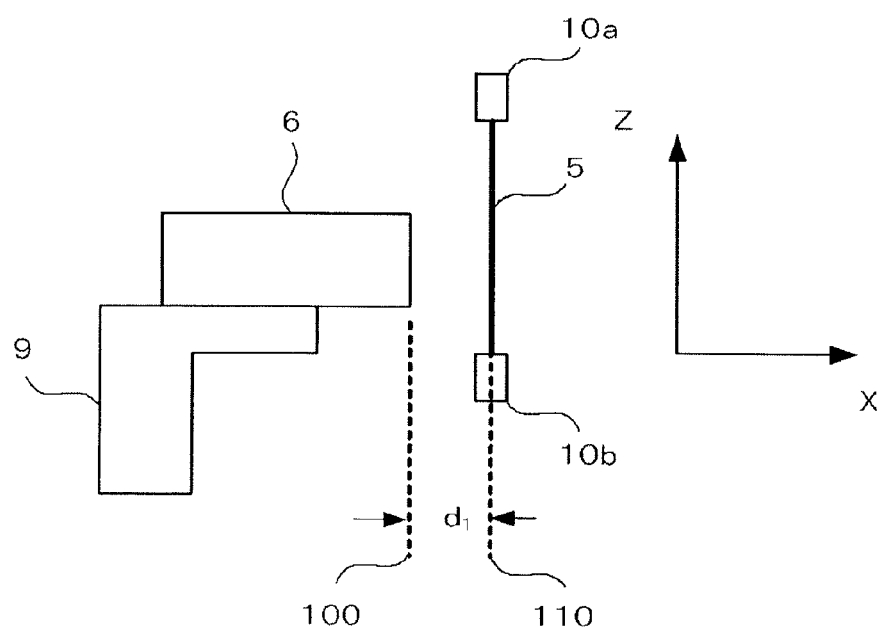
FIG. 6 illustrates that the wire electrode is moved backward by a predetermined distance from the position of the end surface of the workpiece after the position of the end surface of the workpiece is detected.

Next, after the contact of the wire electrode 5 with respect to the end surface 6*a* of the workpiece 6 is detected, the wire electrode 5 is moved backward in the X-axis direction from the position of the end surface 6*a* (a first position shown by a dashed line 100) by a fixed distance $d_1$ as shown in FIG. 6. The X-axis direction positions of the upper and lower wire guides 10*a* and 10*b* which are moved backward are shown by a dashed line 110. Concerning this backward movement up to the dashed line 110, the workpiece 6 may be moved with respect to the positions of the upper and lower wire guides 10*a* and 10*b* by the driving device or the upper and lower wire guides 10*a* and 10*b* may be moved with respect to the position of the workpiece 6, depending on the mechanical configuration of the wire-cut electric discharge machine.

Figure 7:
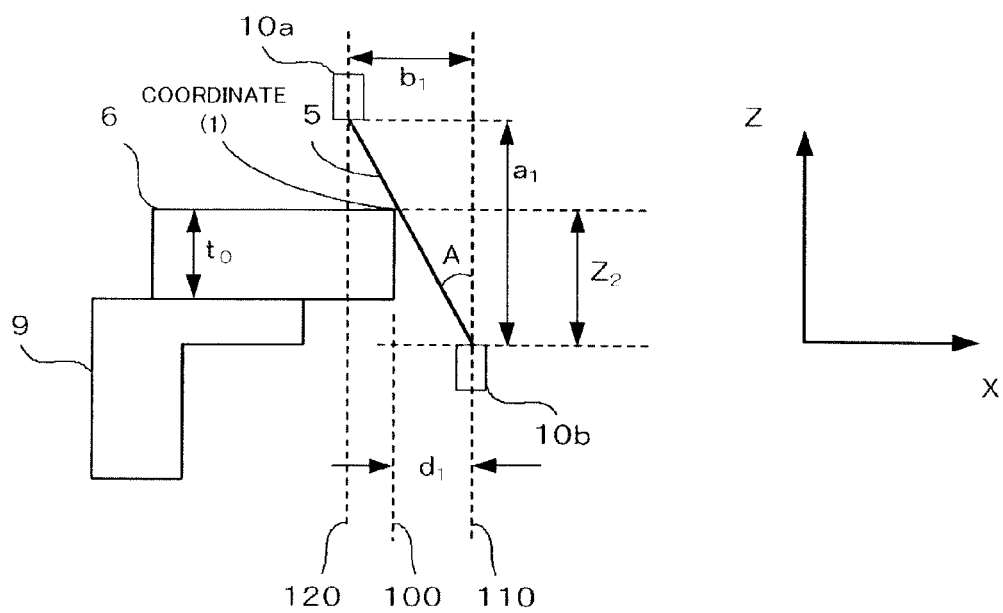
FIG. 7 illustrates that the upper wire guide is moved toward the workpiece until the wire electrode contacts with the workpiece.

Then, as shown in FIG. 7, the upper wire guide 10*a* is moved in the X-axis direction toward the workpiece 6 until the wire electrode 5 contacts with the workpiece 6. When the wire electrode 5 contacts with the workpiece 6, the movement of the upper wire guide 10*a* is stopped. In FIG. 7, the stop position of the upper wire guide 10*a* is defined as a third position shown by a dashed line 120 of FIG. 7. The position where the workpiece 6 and the wire electrode 5 contact with each other is set as a coordinate (1). The stop position (the third position) of the upper wire guide 10*a* is a position obtained when the upper wire guide 10*a* is moved in the X-axis direction by $b_1$ from the backward movement position in FIG. 6. In FIG. 7, an angle A formed by the dashed line 100 and the wire electrode 5 can be obtained by the following formula (1).

$$A = \tan^{-1}\left(\frac{b_1}{a_1}\right) \quad (1)$$

In the above formula, $a_1$ denotes a distance in the Z-axis direction from the lower wire guide 10*b* to the upper wire guide 10*a*.

$Z_2$ in FIG. 7 is a Z coordinate value of the coordinate (1) and denotes a distance in the Z-axis direction from the lower wire guide 10*b* to an upper end portion of the end surface 6*a* of the workpiece 6 (in other words, from the lower wire guide 10*b* to the end portion of the upper plane surface 6*b* of the workpiece 6). This $Z_2$ can be obtained by the following formula (2) by using a backward movement amount $d_1$ of the upper and lower wire guides 10*a* and 10*b* from the end surface 6*a* of the workpiece 6 and the angle A of the wire electrode 5.

$$Z_2 = \frac{d_1}{\tan A} \quad (2)$$

Figure 8:
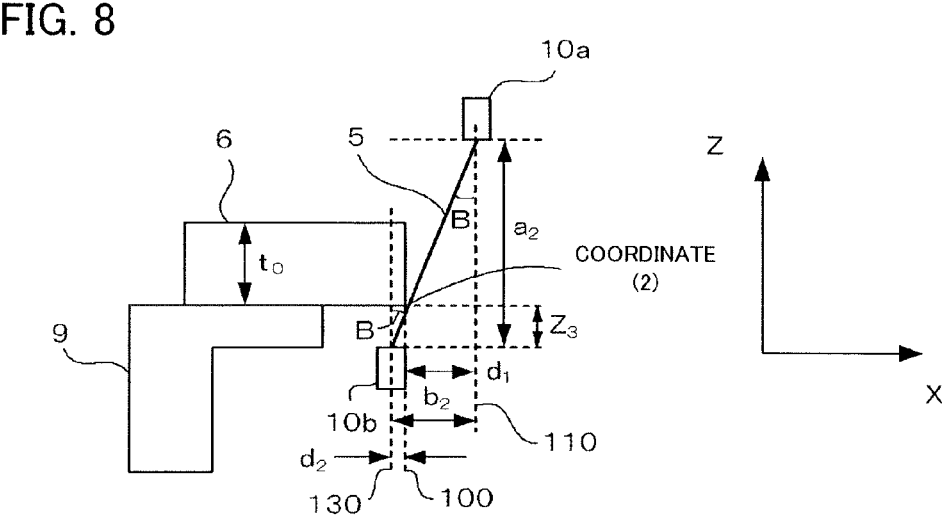
FIG. 8 illustrates that the lower wire guide is moved toward the workpiece until the wire electrode contacts with the workpiece.

Here, in FIG. 7, a distance $a_1$ and a distance $d_1$ are set values, a distance $b_1$ is a detected value, and $d_1/Z_2 = b_1/a_1$ is satisfied, so that $Z_2$ can be obtained by a calculation of $Z_2 = a_1 \times d_1/b_1$. Accordingly, the X-axis direction distance $d_1$ and the Z-axis direction distance $Z_2$ from the lower wire guide 10*b*, which are shown in FIG. 7, on a position (coordinate (1)) where the workpiece 6 contacts with the wire electrode 5 can be obtained. Here, an X-axis direction distance $d_2$ and a Z-axis direction distance $Z_3$ from the lower wire guide 10*b*, which are shown in FIG. 8, on a position (coordinate (2)) where workpiece 6 contacts with the wire electrode 5 can be obtained in a similar manner.

The "first position" shown by the dashed line 100, the "second position" shown by the dashed line 110, and the "third position" shown by the dashed line 120 in FIG. 7 are stored in a storage region in the numerical controller 2 which controls the wire-cut electric discharge machine. In the same manner, later-described positions shown by dashed lines 130, 140, 150, 200, 210, 220, 230, 240, 250, 300, 310, 320, 330, and 340 of FIGS. 8, 10 to 14, 16, 18, and 19 are also stored in the storage region in the numerical controller 2.

A method for detecting the position of the lower plane surface 6*c* of the workpiece 6 is now described with reference to FIGS. 6 and 8.

The upper wire guide 10*a* is first moved backward in the X-axis direction to a position away at the fixed distance $d_1$ (a second position shown by the dashed line 110) from a position, which is an original position, of the end surface 6*a* of the workpiece 6 (the first position shown by the dashed line 100). A state after this movement is shown in FIG. 6.

Then, as shown in FIG. 8, the lower wire guide 10*b* is moved in the X-axis direction toward the workpiece 6 until the wire electrode 5 contacts with the workpiece 6, so as to detect a position (a third position shown by the dashed line 130) of the lower wire guide 10*b* at a time when the wire electrode 5 contacts with the workpiece 6. The X-axis direction distance and the Z-axis direction distance of the position (coordinate (2)) where the workpiece 6 contacts with the wire electrode 5 in this state, from the lower wire guide 10*b*, are $d_2$ and $Z_3$.

An angle B formed by the dashed line 130 representing the third position and the wire electrode 5 can be obtained by the following formula (3).

$$B = \tan^{-1}\left(\frac{b_2}{a_2}\right) \quad (3)$$

Here, $b_2$ and $a_2$ are respectively the X-axis distance and the Z-axis distance from the lower wire guide 10*b* to the upper wire guide 10*a*.

$Z_3$ shown in FIG. 8 is a Z coordinate value of the coordinate (2), and denotes a distance in the Z-axis direction from the lower wire guide 10*b* to a lower end portion of the end surface 6*a* of the workpiece 6 (in other words, from the lower wire guide 10*b* to the end portion of the lower plane surface 6*c* of the workpiece 6). This $Z_3$ can be obtained by the following formula (4) by using $d_2$ ($=b_2-d_1$) and the angle B of the wire electrode 5.

$$Z_3 = \frac{d_2}{\tan B} \quad (4)$$

Accordingly, thickness $t_0$ of the workpiece 6 can be obtained by the following formula (5).

$$t_0 = Z_2 - Z_3 \quad (5)$$

Figure 9:
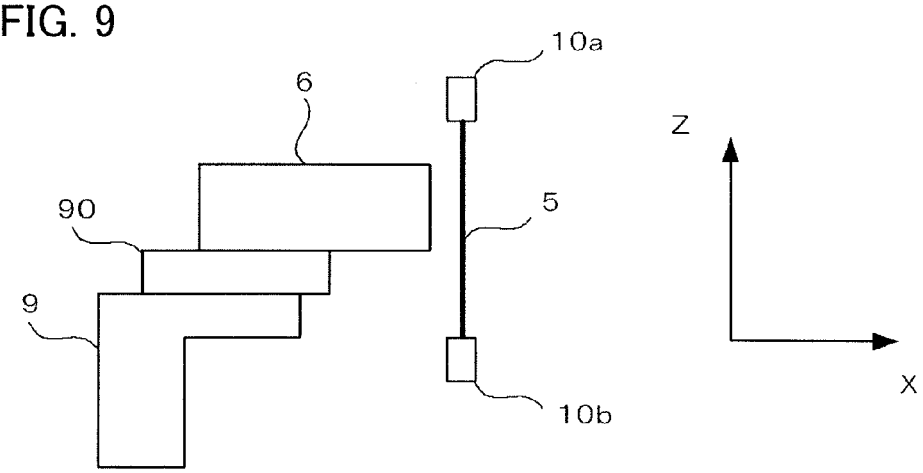
FIG. 9 illustrates a case where the workpiece is fixed with a workpiece fixing jig.

The above description shows an example of directly fixing the workpiece 6 on the workpiece placing table 9. Next, an example that the workpiece 6 is fixed on the workpiece placing table 9 by means of a workpiece fixing jig 90 is described with reference to FIGS. 9 to 11. In FIG. 9, the positional relationship between the wire electrode 5 and the end surface 6a of the workpiece 6 is the same as that of the case of FIG. 4.

Figure 10:
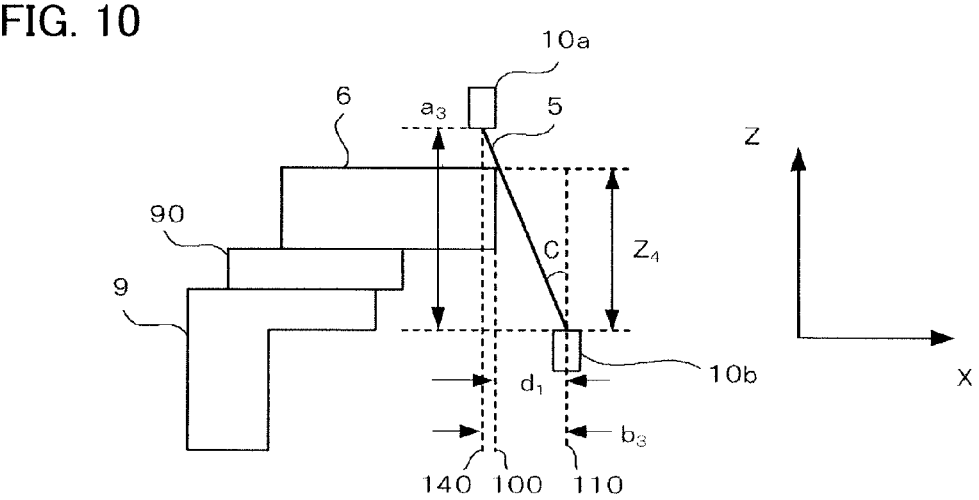
FIG. 10 illustrates that the upper wire guide is moved toward the workpiece until the wire electrode contacts with the workpiece.

FIG. 10 illustrates that the upper wire guide 10a is moved in the X-axis direction toward the workpiece 6 until the wire electrode 5 contacts with the workpiece 6.

The upper wire guide 10a is moved in the X-axis direction from a state where the upper and lower wire guides 10a and 10b are positioned away from the end surface 6a of the workpiece 6 at the distance of $d_1$ until the wire electrode 5 contacts with the workpiece 6. A position of the upper wire guide 10a at a time when the wire electrode 5 contacts with the workpiece 6 is shown by the dashed line 140. An angle C formed by the dashed line 110 representing the second position and the wire electrode 5 can be obtained by the following formula (6).

$$C = \tan^{-1}\left(\frac{b_3}{a_3}\right) \tag{6}$$

Here, $b_3$ and $a_3$ are an X-axis direction distance and a Z-axis direction distance from the upper wire guide 10a to the lower wire guide 10b.

$Z_4$ shown in FIG. 10 is a distance in the Z-axis direction from the lower wire guide 10b to a portion, which contacts with the wire electrode 5, of the workpiece 6, and is a distance in the Z-axis direction from the lower wire guide 10b to an upper end portion of the end surface 6a of the workpiece 6 (in other words, from the lower wire guide 10b to the end portion of the upper plane surface 6b of the workpiece 6). This $Z_4$ can be obtained by the following formula (7) by using the backward movement amount $d_1$ of the upper and lower wire guides 10a and 10b from the end surface 6a of the workpiece 6 and the angle C of the wire electrode 5.

$$Z_4 = \frac{d_1}{\tan C} \tag{7}$$

Next, only the upper wire guide 10a is moved so as to be returned to the original position (the second position shown by the dashed line 110). The returned positional relationship between the wire electrode 5 and the end surface 6a of the workpiece 6 is the same as that in FIG. 6.

Figure 11:
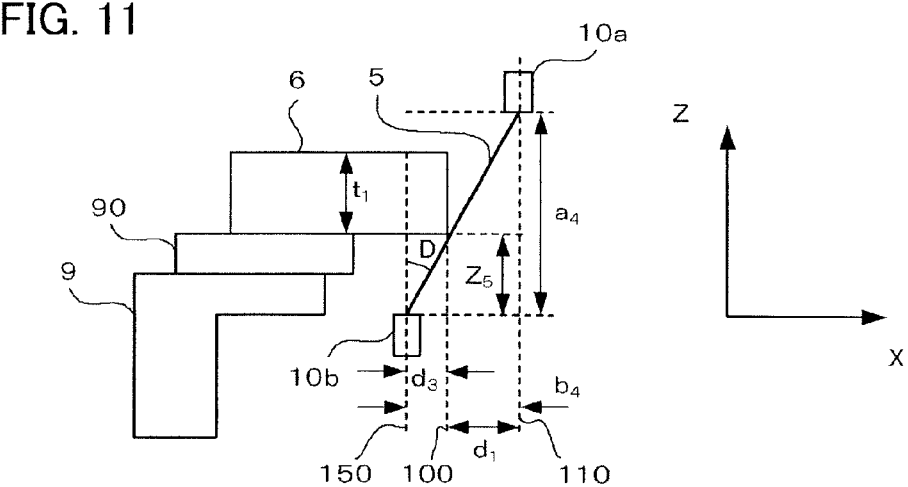
FIG. 11 illustrates that the lower wire guide is moved toward the workpiece until the wire electrode contacts with the workpiece.

FIG. 11 illustrates that the lower wire guide 10b is moved in the X-axis direction toward the workpiece 6 until the wire electrode 5 contacts with the workpiece 6. The dashed line 150 represents an X-axis direction position of the lower wire guide 10b which is moved. An angle D formed by the dashed line 150 and the wire electrode 5 can be obtained by the following formula (8).

$$D = \tan^{-1}\left(\frac{b_4}{a_4}\right) \tag{8}$$

Here, $b_4$ and $a_4$ are an X-axis direction distance and a Z-axis direction distance from the lower wire guide 10b to the upper wire guide 10a.

$Z_5$ shown in FIG. 11 is a Z coordinate value of a portion, which contacts with the wire electrode 5, of the workpiece 6, and denotes a distance in the Z-axis direction from the lower wire guide 10b to a lower end portion of the end surface 6a of the workpiece 6 (in other words, from the lower wire guide 10b to the end portion of the lower plane surface 6c of the workpiece 6). This $Z_5$ can be obtained by the following formula (9) by using the distance $d_3$ (=$b_4$−$d_1$) and the angle D of the wire electrode 5.

$$Z_5 = \frac{d_3}{\tan D} \tag{9}$$

The $Z_5$ can be considered as the Z-axis coordinate value of the lower plane surface 6c of the workpiece 6. Accordingly, thickness $t_1$ of the workpiece 6 can be obtained by the following formula (10).

$$t_1 = Z_4 - Z_5 \tag{10}$$

The $Z_4$ (refer to FIG. 10) obtained by the above formula (7) can be considered as the Z-axis coordinate value of the upper plane surface 6b of the workpiece 6, so that an end of the nozzle 8a can be adjusted to the Z-axis coordinate value (level) by automatic adjustment, without manual operation. Further, the thickness of the workpiece 6, that is, board thickness can be obtained, so that a machining condition can be automatically determined from the obtained board thickness. When the machining condition is predetermined, whether the predetermined board thickness of the workpiece 6 is correct or not is determined. In a case where the predetermined board thickness of the workpiece 6 is incorrect, the machining condition can be reset so as to correspond to the obtained board thickness of the workpiece 6.

It is ideal that the workpiece 6 is placed on the workpiece placing table 9 in such manner that the lower plane surface 6c is parallel with a placing surface of the workpiece placing table 9. However, there are some cases where the workpiece 6 is not horizontally placed due to some factors.

Figure 12:
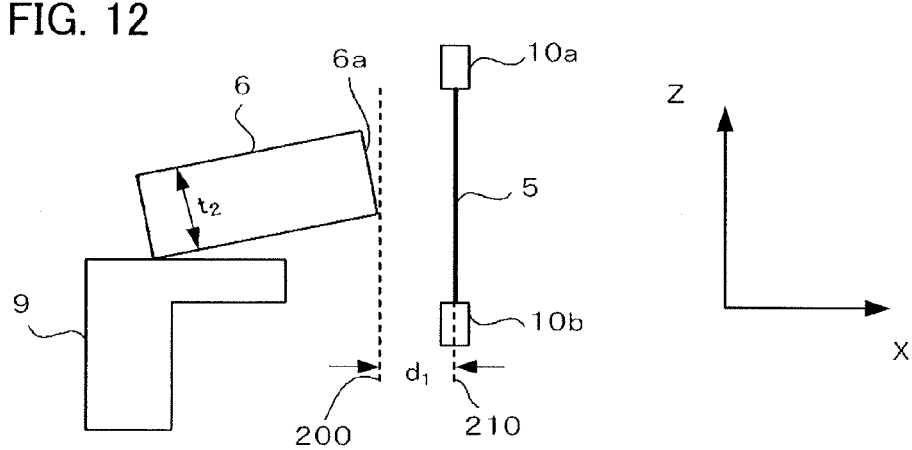
FIG. 12 illustrates a case where the workpiece is placed on a workpiece placing table in an inclined manner.

FIG. 12 illustrates a case where the workpiece 6 is placed on the workpiece placing table 9 in an inclined manner.

In a case where the workpiece 6 is not horizontally placed on the workpiece placing table 9 as the state shown in FIG. 12 and FIG. 18 which is described later, the board thickness of the workpiece 6 which is calculated by the above-mentioned method includes an error. If level adjustment of the upper and lower nozzles 8a and 8b is performed based on the board thickness of the workpiece 6 in which an error is included, those upper and lower nozzles 8a and 8b may hit the workpiece 6 and therefore the upper and lower nozzles 8a and 8b get damaged, or electric discharge machining is executed in a state where the upper and lower nozzles 8a and 8b are insufficiently close to the surface of the workpiece 6. Thus, above described problems occur.

Figure 13:
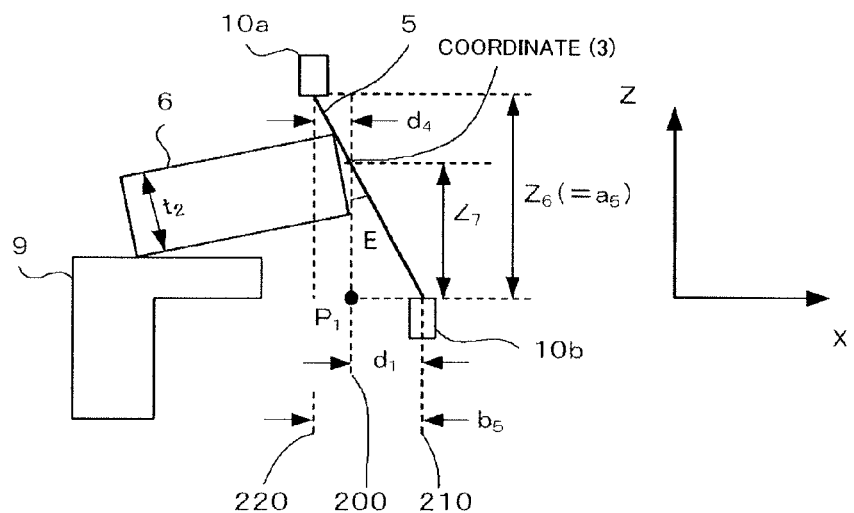
FIG. 13 illustrates a case where the wire electrode having certain inclination contacts with the workpiece which is inclined.

Here, an automatic adjustment method of the upper and lower nozzles 8a and 8b in a case where the workpiece 6 is not horizontally placed on the placing surface of the workpiece placing table 9 is described with reference to FIGS. 12 and 13. FIG. 13 illustrates a state where the wire electrode 5 contacts with the workpiece 6 with a certain inclination.

A state where the workpiece 6 is inclined in a direction in which the upper end portion of the end surface 6a of the workpiece 6 moves away from the wire electrode 5 as shown in FIG. 12 is referred to below as an "inclination state 1".

As shown in FIG. 12, the wire electrode 5 is brought into contact with the workpiece 6 so as to detect a position of the end surface 6a of the workpiece 6 (an X-axis position shown by the dashed line 200) as is the case with FIG. 5. Then, the upper and lower wire guides 10*a* and 10*b* are simultaneously moved backward by the distance d₁ from the end surface 6*a* of the workpiece 6 (X-axis direction positions of the upper and lower wire guides 10*a* and 10*b* which are moved backward are shown by the dashed line 210) as is the case of FIG. 6.

Subsequently, as shown in FIG. 13, the upper wire guide 10*a* is moved in the X-axis direction toward the workpiece 6 so as to bring the wire electrode 5 into contact with the workpiece 6. The dashed line 220 represents an X-axis direction position of this contacting position. An angle E formed by the dashed line 200 and the wire electrode 5 can be obtained by the following formula (11).

$$E = \tan^{-1}\left(\frac{b_5}{a_5}\right) \quad (11)$$

Here, as in the case where $Z_2$ shown in FIG. 7 is obtained by the above formula (2), $Z_7$ which is a Z coordinate value of a coordinate (3) is obtained by the following formula (12) by using a backward movement amount d₁ of the upper and lower wire guides 10*a* and 10*b* from the end surface 6*a* of the workpiece 6 and the angle E of the wire electrode 5.

$$Z_7 = \frac{d_1}{\tan E} \quad (12)$$

From this, it is understood that this $Z_7$ does not show a Z-axis direction position of the upper plane surface 6*b* of the workpiece 6 as shown in FIG. 13.

Figure 14:
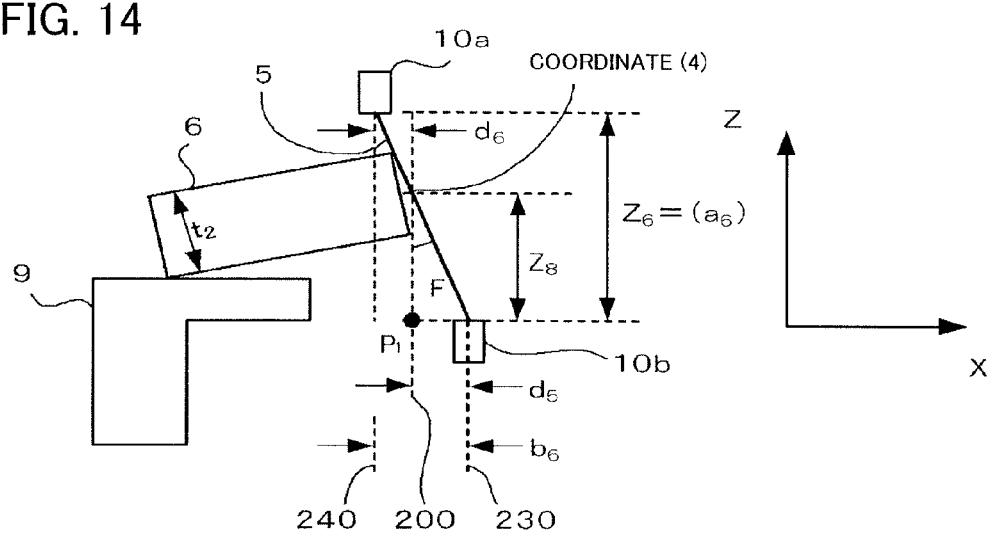
FIG. 14 illustrates a case where the wire electrode having inclination different from that of FIG. 13 contacts with the workpiece which is shown in FIG. 13.

Subsequent to the state of FIG. 13, the upper and lower wire guides 10*a* and 10*b* are moved in the X-axis direction to backward positions from the end surface 6*a* of the workpiece 6 by a distance d₅ (<d₁) (in other words, the upper and lower wire guides 10*a* and 10*b* are moved to positions on the dashed line 230 of FIG. 14). Then, the upper wire guide 10*a* is moved in the X-axis direction until the wire electrode 5 contacts with the workpiece 6 (moved to an X-axis direction position shown by the dashed line 240) as shown in FIG. 14.

FIG. 14 illustrates a case where the wire electrode 5 contacts with the workpiece 6 with an inclination which is different from that shown in FIG. 13. It is sufficient that the distance d₅ shown in FIG. 14 is different from the distance d₁ shown in FIG. 13, and the distance d₅ is not limited to the condition of d₅<d₁. An angle F shown in FIG. 14 is formed by the dashed line 200 and the wire electrode 5, and this angle F can be obtained by the following formula (13).

$$F = \tan^{-1}\left(\frac{b_6}{a_6}\right) \quad (13)$$

Here, $Z_8$ which is a Z coordinate value of a coordinate (4) can be obtained by the following formula (14) by using the distance d₅ (=(b₆−d₅)) and the angle F.

$$Z_8 = \frac{d_5}{\tan F} \quad (14)$$

Though this $Z_8$ does not correctly show a position in the Z-axis direction of the upper plane surface 6*b* of the workpiece 6, it has already shown that a relationship of $Z_7 > Z_8$ is satisfied when the upper and lower wire guides 10*a* and 10*b* are moved and measured, as described above. Accordingly, it is understood that the workpiece 6 is inclined with respect to the workpiece placing table 9 as shown in FIG. 12 (inclination state 1). In this specification, the description has been given on the premise that the workpiece 6 is inclined as shown in FIG. 12 thus far. However, in actual machining, it is hard to determine whether the workpiece 6 is inclined. If $Z_7$ is equal to $Z_8$ ($Z_7 = Z_8$), it can be considered that the end surface 6*a* of the workpiece 6 is vertical or inclined as FIG. 18 described later. Here, the end surface 6*a* of the workpiece 6 is set to be orthogonal to both of the upper plane surface 6*b* and the lower plane surface 6*c*.

Figure 15:
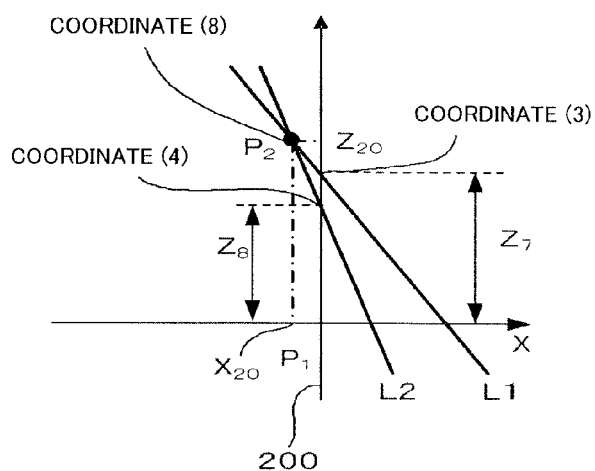
FIG. 15 illustrates states of the wire electrode of FIGS. 13 and 14.

Here, such a case is considered that the workpiece 6 is horizontally placed on the placing surface of the workpiece placing table 9 and the end surface 6*a* of the workpiece 6 is a vertical surface. The dashed line 200 which is a vertical line passing the end surface 6*a* of the workpiece 6 is set as the Z axis, a horizontal line which is orthogonal to the Z axis and passes the lower wire guide 10*b* is set as the X axis, and an intersection of the Z axis and the X axis is denoted as $P_1$. FIG. 15 shows a state of the wire electrode 5 shown in FIGS. 13 and 14 by using an X-Z coordinate system of which an origin is the $P_1$. In FIG. 15, a straight line L1 represents a posture of the wire electrode 5 of FIG. 13 and a straight line L2 represents a posture of the wire electrode 5 of FIG. 14. Here, $Z_7$ is an intercept of the straight line L1 on the Z axis and $Z_8$ is an intercept of the straight line L2 on the Z axis.

The straight lines L1 and L2 on the X-Z coordinate system of which the origin is $P_1$ can be expressed as the following formulas (15) and (16).

$$Z = -\frac{X}{\tan E} + \frac{d_1}{\tan E} \quad (15)$$

$$Z = -\frac{X}{\tan F} + \frac{d_5}{\tan F} \quad (16)$$

Further, in the X-Z coordinate system of which the origin is $P_1$ shown in FIG. 15, an intersection of the straight line L1 and the straight line L2 is denoted as $P_2$ (coordinate (8)), and an X coordinate value and a Z coordinate value of the intersection $P_2$ are respectively denoted as $X_{20}$ and $Z_{20}$. That is, this intersection $P_2$ represents a position of the lower end portion of the end surface 6*a* of the workpiece 6 shown in FIG. 12, at which the lower end portion contacts with the wire electrode in a case where the upper and lower wire guides 10*a* and 10*b* are on positions shown in FIG. 13 and also in another case where the upper and lower wire guides 10*a* and 10*b* are on positions shown in FIG. 14.

Next, a method for obtaining a position of the lower plane surface 6*c* of the workpiece 6 is described with reference to FIG. 16.

The upper and lower wire guides 10*a* and 10*b* are first returned to original positions shown by the dashed line 210. Here, the original positions are not limited to the position which is away from the position of the dashed line 200, which represents the position of the end surface 6*a* of the workpiece 6, in the X-axis direction at the distance d₁ shown in FIG. 13.

Figure 16:
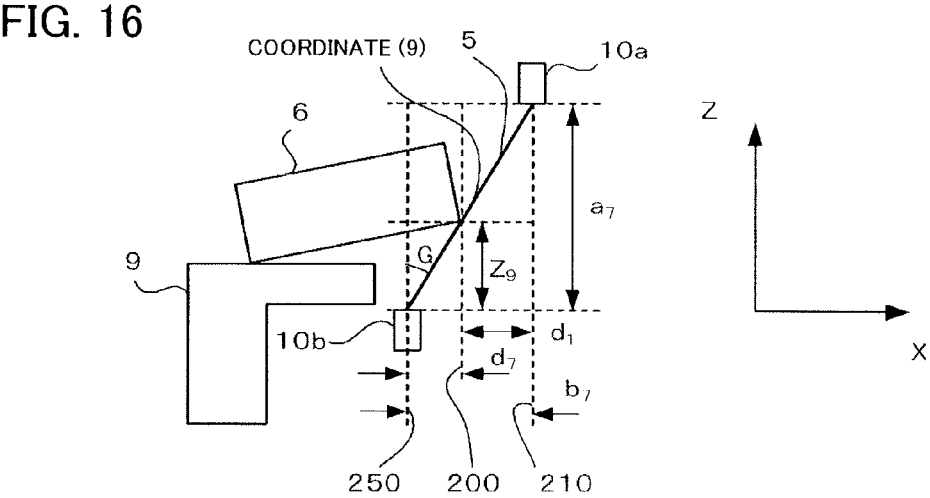
FIG. 16 illustrates a case where the wire electrode having certain inclination contacts with the workpiece which is inclined.

Then, as shown in FIG. 16, the lower wire guide 10*b* is moved in the X-axis direction until the wire electrode 5 contacts with the workpiece 6. A position in the X-axis direction of the lower wire guide 10*b* at a time when the wire electrode 5 contacts with the workpiece 6 is shown by the dashed line 250. The lower wire guide 10*b* at this time is positioned forward from the position of the dashed line 200 by a distance $d_7$. An angle G formed by the dashed line 250 and the wire electrode 5 can be obtained by the following formula (17).

$$G = \tan^{-1}\left(\frac{b_7}{a_7}\right) \quad (17)$$

Here, in the above formula, $b_7$ is sum of $d_7$ and $d_1$ ($b_7 = d_7 + d_1$). $a_7$ is a distance in the Z-axis direction from the lower wire guide 10b to the upper wire guide 10a.

$Z_9$ which is a Z coordinate value of a coordinate (9) shown in FIG. 16 can be obtained by the following formula (18) by using the distance $d_7$ at this time and the angle G.

$$Z_9 = \frac{d_7}{\tan G} \quad (18)$$

The automatic adjustment method of the upper and lower nozzles 8a and 8b in a case where the workpiece 6 is not horizontally placed on the placing surface of the workpiece placing table 9 has been described thus far with reference to FIGS. 12 and 13. However, in actual machining, it is hard to preliminarily determine fine inclination of the workpiece.

Therefore, after the measurement performed in FIG. 16 by moving the upper and lower wire guides 10a and 10b backward from the end surface 6a of the workpiece 6 by the backward movement amount $d_1$, measurement by moving the upper and lower wire guides 10a and 10b backward from the end surface 6a of the workpiece 6 by a backward movement amount $d_5$ ($\neq d_1$) is performed as in the case of the measurement performed in FIGS. 14 and 15. The resulting level of the lower plane surface 6c of the workpiece 6 is denoted as $Z_9'$. In a case where the workpiece 6 is inclined as shown in FIG. 12, $Z_9$ becomes equal to $Z_9'$ ($Z_9 = Z_9'$).

Here, it can be determined that the workpiece 6 is in the "inclination state 1" from the relationship of $Z_7 \neq Z_8$ and $Z_9 = Z_9'$.

Figure 17:
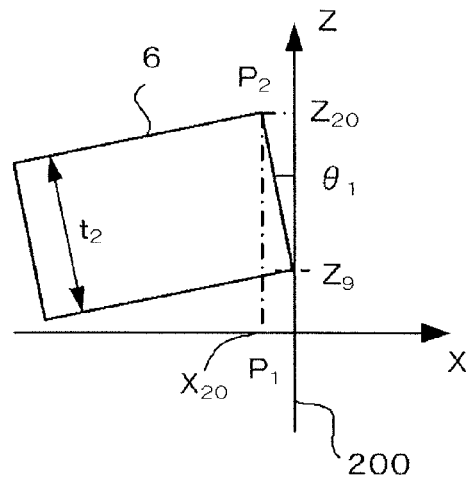
FIG. 17 is an illustration for explaining formulas of inclination, board thickness, and an upper surface of the workpiece which is inclined.

Based on the above-mentioned result, in the X-Z coordinate of which the origin is $P_1$, a distance between the point $Z_9$ on the Z axis and the intersection $P_2$ (coordinate (8)) of the straight line L1 and the straight line L2 shown in FIG. 15 is calculated as board thickness $t_2$ of the workpiece 6, as shown in FIG. 17. At the same time, it is understood that the workpiece 6 is inclined from the vertical direction by an angle $\theta_1$. This inclination angle $\theta_1$ can be obtained by the following formula (19).

$$\theta_1 = \tan^{-1}\left(\frac{x_{20}}{Z_{20} - Z_9}\right) \quad (19)$$

A case where the inclination of the workpiece 6 is the inclination state 2 is now described.

Figure 18:
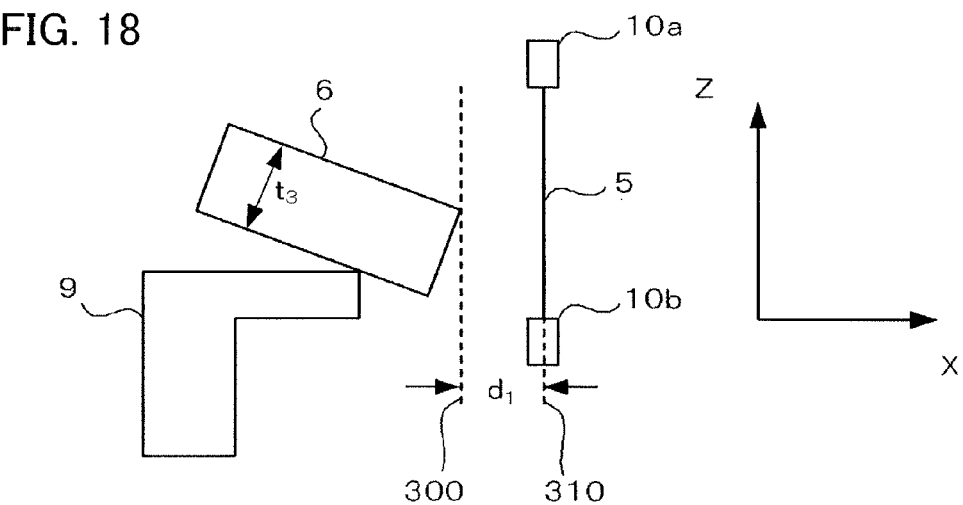
FIG. 18 illustrates that the wire electrode is moved backward by a distance $d_i$ after the wire electrode is once brought into contact with an end of the workpiece.

FIG. 18 illustrates that after the wire electrode 5 is once brought into contact with the workpiece 6, the upper and lower wire guides 10a and 10b are moved backward by the distance $d_1$.

A state where the workpiece 6 is inclined in a direction in which the lower end portion of the end surface 6a of the workpiece 6 moves away from the wire electrode 5 as shown in FIG. 18 is referred to below as an "inclination state 2".

Figure 19:
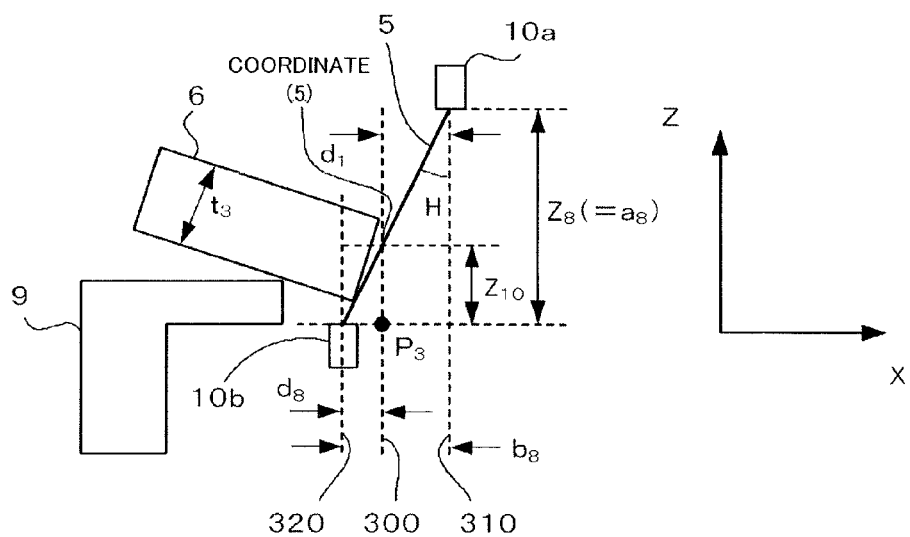
FIG. 19 illustrates a case where the wire electrode having certain inclination contacts with the workpiece which is inclined.

As shown in FIG. 18, after the wire electrode 5 is once brought into contact with the workpiece 6 and the contact position (an X-axis direction position shown by the dashed line 300) is detected, the upper and lower wire guides 10a and 10b are moved backward by the distance $d_1$ (the X-axis direction positions of the upper and lower wire guides 10a and 10b which are moved backward are shown by the dashed line 310). Subsequently, as shown in FIG. 19, the lower wire guide 10b is moved until the wire electrode 5 contacts with the workpiece 6. A position in the X-axis direction of the lower wire guide 10b at a time when the wire electrode 5 contacts with the workpiece 6 is shown by the dashed line 320. The lower wire guide 10b at this time is positioned forward from the position of the dashed line 300 by a distance $d_8$. An angle H (refer to FIG. 19) formed by the dashed line 310 and the wire electrode 5 can be obtained by the following formula (20).

$$H = \tan^{-1}\left(\frac{b_8}{a_8}\right) \quad (20)$$

In the above formula, $b_8$ is sum of $d_8$ and $d_1$ ($b_8 = d_8 + d_1$). $a_8$ denotes a distance in the Z-axis direction from the lower wire guide 10b to the upper wire guide 10a.

$Z_{10}$ which is a Z coordinate value of a coordinate (5) shown in FIG. 19 can be obtained by the following formula (21) by using the distance $d_8$ at this time and the angle H.

$$Z_{10} = \frac{d_8}{\tan H} \quad (21)$$

Figure 20:
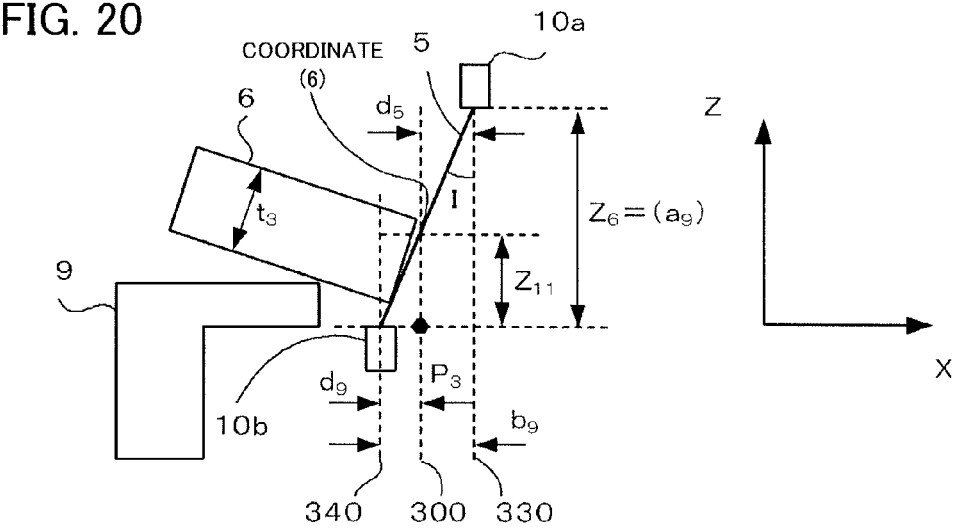
FIG. 20 illustrates a case where the wire electrode having inclination different from that of FIG. 19 contacts with the workpiece which is shown in FIG. 19.

Subsequent to the state of FIG. 19, the upper and lower wire guides 10a and 10b are moved in the X-axis direction to backward positions from the end surface 6a of the workpiece 6 by the distance $d_5$ ($< d_1$) (in other words, the upper and lower wire guides 10a and 10b are moved to positions on the dashed line 330 of FIG. 20). Then, the lower wire guide 10b is moved in the X-axis direction until the wire electrode 5 contacts with the workpiece 6 as shown in FIG. 20. The position in the X-axis direction of the lower wire guide 10b at a time when the wire electrode 5 contacts with the workpiece 6 is shown by the dashed line 340. The lower wire guide 10b at this time is positioned forward from the position of the dashed line 300 by the distance $d_9$. An angle I formed by the dashed line 330 and the wire electrode 5 can be obtained by the following formula (22). Here, it is sufficient that $d_1$ is not equal to $d_5$ ($d_1 \oplus d_5$), so that $d_5$ is not limited to be smaller than $d_1$.

$$I = \tan^{-1}\left(\frac{b_9}{a_9}\right) \quad (22)$$

In the above formula, $b_9$ is sum of $d_9$ and $d_5$ ($b_9 = d_9 + d_5$). $a_9$ is a distance in the Z-axis direction from the lower wire guide 10b to the upper wire guide 10a.

$Z_{11}$ which is a Z coordinate value of a coordinate (6) shown in FIG. 20 can be obtained by the following formula (23) by using the distance $d_9$ at this time and the angle I.

$$Z_{11} = \frac{d_9}{\tan I} \quad (23)$$

These $Z_{10}$ and $Z_{11}$ do not correctly show the position in the Z-axis direction of the lower plane surface 6c of the workpiece 6.

Figure 21:
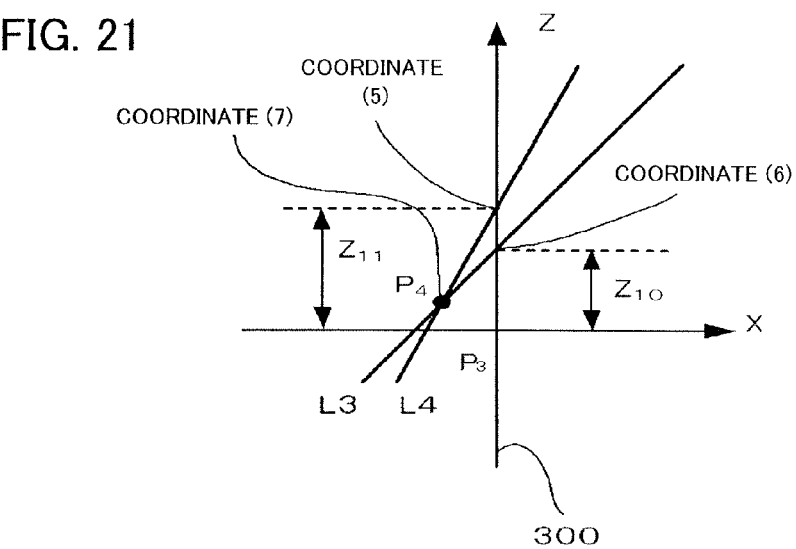
FIG. 21 illustrates states of the wire electrode of FIGS. 19 and 20.

Here, a case where the workpiece 6 is horizontally placed on the placing surface of the workpiece placing table 9 and the end surface 6a of the workpiece 6 is a vertical surface is considered. The dashed line 300 which is a vertical line passing the end surface 6a of the workpiece 6 is assumed to be the Z axis, a horizontal direction line which is orthogonal to the Z axis and passes the lower wire guide 10b is assumed to be the X axis, and an intersection of the Z axis and the X axis is denoted as $P_3$. FIG. 21 expresses a posture of the wire electrode 5, which is shown in FIGS. 19 and 20, in the form of a straight line by using an X-Z coordinate system of which the origin is $P_3$. In FIG. 21, a straight line L3 represents the state of the wire electrode 5 of FIG. 19 and a straight line L4 represents the state of the wire electrode 5 of FIG. 20. Here, $Z_{10}$ is an intercept of the straight line L3 on the Z axis and $Z_{11}$ is an intercept of the straight line L4 on the Z axis.

The straight lines L3 and L4 on the X-Z coordinate system of which the origin is $P_3$ can be expressed as the following formulas (24) and (25).

$$Z = \frac{X}{\tan H} + \frac{d_8}{\tan H} \quad (24)$$

$$Z = \frac{X}{\tan I} + \frac{d_9}{\tan I} \quad (25)$$

Further, in the X-Z coordinate system of which the origin is $P_3$ shown in FIG. 21, an intersection of the straight line L3 and the straight line L4 is denoted as $P_4$ (coordinate (7)), and an X coordinate value and a Z coordinate value of the intersection $P_4$ are respectively denoted as $X_{21}$ and $Z_{21}$. That is, this intersection $P_4$ represents a position of the upper end portion of the end surface 6a of the workpiece 6 shown in FIG. 18, at which the upper end portion contacts with the wire electrode in a case where the upper and lower wire guides 10a and 10b are on positions shown in FIG. 19 and also in a case where those upper and lower wire guides 10a and 10b are on other positions shown in FIG. 20.

The upper and lower wire guides 10a and 10b are returned to the original positions shown by the dashed line 300.

Figure 22:
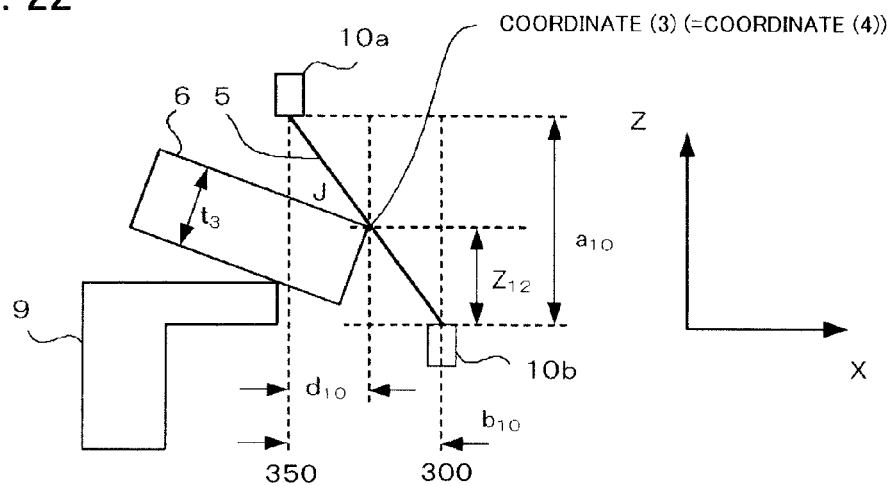
FIG. 22 illustrates a state where the wire electrode is brought into contact with the workpiece which is in the states of FIG. 19 and FIG. 20.

Subsequently, as shown in FIG. 22, the upper wire guide 10a is moved until the wire electrode 5 contacts with the workpiece 6. A position of the upper wire guide 10a in the X-axis direction at a time when the wire electrode 5 contacts with the workpiece 6 is shown by the dashed line 350. The upper wire guide 10a at this time is positioned forward from the original position of the dashed line 300 by a distance $b_{10}$. An angle J formed by the dashed line 350 and the wire electrode 5 can be obtained by the following formula (26).

$$J = \tan^{-1}\left(\frac{b_{10}}{a_{10}}\right) \quad (26)$$

In the above formula, $a_{10}$ denotes a distance in the Z-axis direction from the lower wire guide 10b to the upper wire guide 10a.

$Z_{12}$ which is the Z coordinate value of the coordinate (3) (=coordinate (4)) can be obtained by the following formula (27) by using the distance $d_{10}$ at this time and the angle J. Here, in the state where the coordinate (3) becomes equal to the coordinate (4) in FIG. 22, measurement of an edge of the upper plane surface 6b of the workpiece 6 can be performed as shown in FIGS. 13 and 14.

$$Z_{12} = \frac{d_{10}}{\tan J} \quad (27)$$

Figure 23:
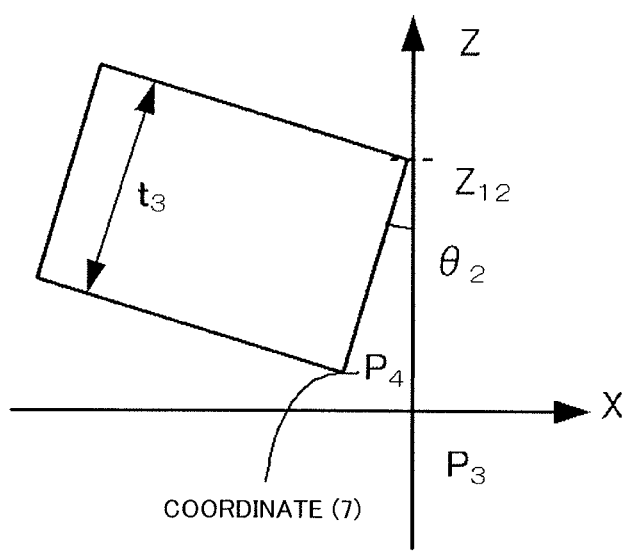
FIG. 23 illustrates formulas of inclination, board thickness, and an upper surface of the workpiece which is inclined.

Here, in the X-Z coordinate of which the origin is $P_3$, a distance between the point $Z_{12}$ on the Z axis and the intersection $P_4$ (coordinate (7)) of the straight line L3 and the straight line L4 shown in FIG. 21 is calculated as board thickness $t_3$ of the workpiece 6, as shown in FIG. 23. At the same time, it is understood that the workpiece 6 is inclined from the vertical direction by an angle $\theta_2$. This inclination angle $\theta_2$ can be obtained by the following formula (28).

$$\theta_2 = \tan^{-1}\left(\frac{x_{21}}{Z_{12} - Z_{21}}\right) \quad (28)$$

If the inclinations $\theta_1$ and $\theta_2$ of the workpiece 6 can be obtained, the upper and lower wire guides 10a and 10b can be moved so that the upper surface of the workpiece 6 and the wire electrode 5 become orthogonal to each other in accordance with the inclinations.

The end surface 6a of the workpiece 6 which is inclined can be expressed by the following formula (29).

$$Z = -\frac{X}{\tan\theta_2} + Z_{12} \quad (29)$$

Here, although it is not clear to what extent the workpiece 6 actually extends in the X-axis negative direction, if it is assumed that the workpiece 6 extends from the measurement point where X coordinate is zero, as shown in FIG. 23, to the point which corresponds to a drive limit of the wire-cut electric discharge machine, then it would be possible to estimate the level of the assumed workpiece 6.

By positioning the end of the upper nozzle 8a in accordance with an above-obtained higher position of the upper surface of the workpiece 6 which is inclined, contact of the workpiece 6 and the end of the upper nozzle 8a can be prevented. Further, a straight line expressing the upper plane surface 6a of the workpiece 6 which is placed to in an inclined manner as shown in FIG. 17 can be obtained by the following formula (30), as is the case with FIG. 23.

$$Z = X \times \tan\theta_1 + (Z_9 + t_2 \times \cos\theta_1) \quad (30)$$

Concerning the above formula (30) as well, if it is assumed that the workpiece 6 extends from the measurement point where X coordinate is zero, as shown in FIG. 23, to the point which corresponds to a drive limit of the wire-cut electric discharge machine, then it would be possible to estimate the level of the assumed workpiece 6, as a result, contact of the workpiece 6 and the end of the upper nozzle 8a can be prevented.

Figure 24:
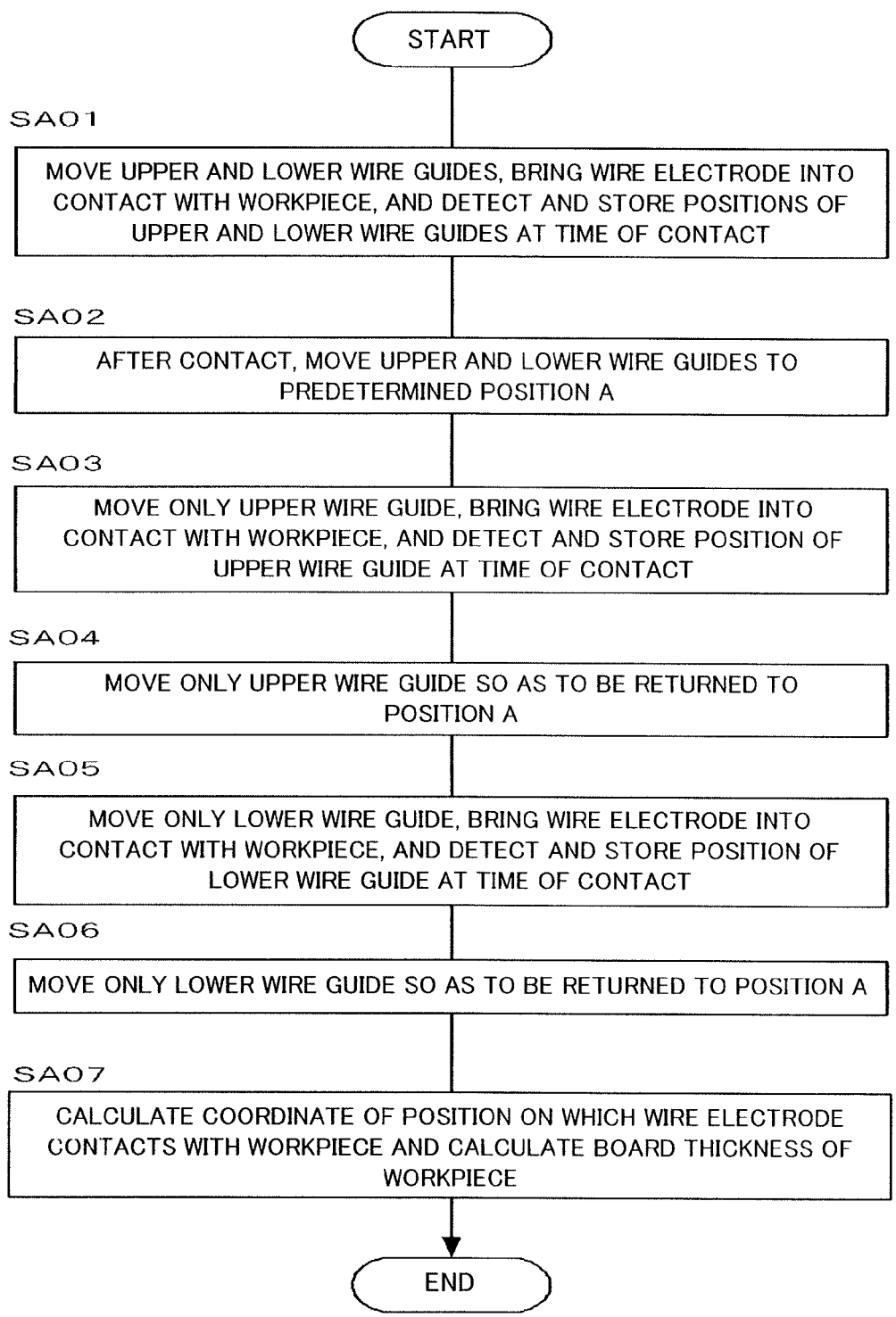
FIG. 24 is a flowchart of algorithm for calculating positions of the upper and lower surfaces and board thicknesses of the workpiece in the wire-cut electric discharge machine according to the present invention.

FIG. 24 is a flowchart of algorithm for calculating positions of the upper and lower surfaces 6b and 6c of the workpiece 6 and board thicknesses in the wire-cut electric discharge machine according to the present invention. Here, it is assumed that the wire electrode 5 keeps a vertical posture with respect to a surface, on which the workpiece 6 is placed, of the workpiece placing table 9, by a vertical adjustment function of the wire-cut electric discharge machine. The vertical adjustment function is a known technique (for example, refer to Japanese Patent Application Laid-Open No. 2003-71636).

The processing executed at respective steps is described below.

[Step SA01] The upper and lower wire guides are moved and thus the wire electrode is brought into contact with the workpiece so as to detect and store positions of the upper and lower wire guides at a time when the wire electrode contacts with the workpiece.

[Step SA02] When the wire electrode contacts with the workpiece, the upper and lower wire guides are moved from the positions to position (position A) backward by a fixed distance ($d_1$).

[Step SA03] Only the upper wire guide is moved and the wire electrode is brought into contact with the workpiece so as to detect and store a position of the upper wire guide at a time of the contact.

[Step SA04] Only the upper wire guide is moved so as to return the upper wire guide to the position A.

[Step SA05] Only the lower wire guide is moved and thus the wire electrode is brought into contact with the workpiece so as to detect and store a position of the lower wire guide at a time of the contact.

[Step SA06] Only the lower wire guide is moved so as to return the lower wire guide to the position A.

[Step SA07] A coordinate value of the position where the wire electrode contacts with the workpiece is calculated and the board thickness of the workpiece is calculated from the calculated coordinate value. Then, this processing is ended.

As supplement description of the above-described flowchart, a "wire electrode inclination angle calculating unit", a "workpiece upper surface position calculating unit", a "workpiece lower surface calculating unit", and a "board thickness calculating unit", which constitutes the wire-cut electric discharge machine according to the present invention, perform the function of step SA07 described above. In this step SA07, calculations for obtaining an inclination angle of the wire electrode, a workpiece upper surface position, a workpiece lower surface position, and board thickness of the workpiece are performed by using the formulas (1) to (24).

In the above description, it is described that the end surface of the workpiece 6 is a vertical surface. The end surface of the workpiece 6 is not a complete vertical surface in reality and has some error. Commonly, the workpiece 6 which is machined with the wire-cut electric discharge machine has thickness ranging from small thickness of approximately 5 mm to large thickness of 300 mm or more.

Figure 25:
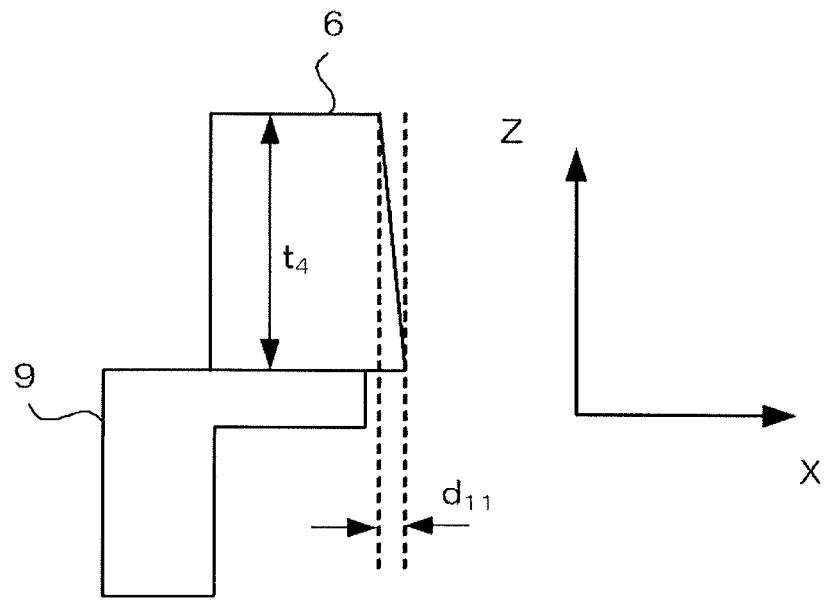
FIG. 25 illustrates a case where the end surface of the workpiece is inclined.

Here, it is assumed that the workpiece 6 having the thickness $t_4$ has an error of $d_{11}$ on its upper and lower surfaces as shown in FIG. 25. In this case, the length of an inclined face (end surface) of the workpiece can be obtained by the following formula (31).

$$\text{Length of inclined face} = \sqrt{(t_4)^2 + (d_{11})^2} \quad (31)$$

In the above-described method for detecting the upper and lower surfaces of the workpiece, the length of the inclined face of the workpiece is falsely recognized as the board thickness of the workpiece. Here, if calculation is performed under conditions of $t_4=10$ mm and $d_{11}=0.3$ mm, the length of the inclined face is approximately 10.0005 mm. Thus, an error is 5 μm. Such small error can be ignored when machining conditions are set and adjustment of a nozzle gap is performed. Thus, there is no problem.

As another example, if calculation is performed under conditions of $t_4=50$ mm and $d_{11}=0.3$ mm, the length of the inclined face is approximately 50.001 mm. Thus, an error is 1 μm, and such small error does not cause any problem as well.

Figure 26:
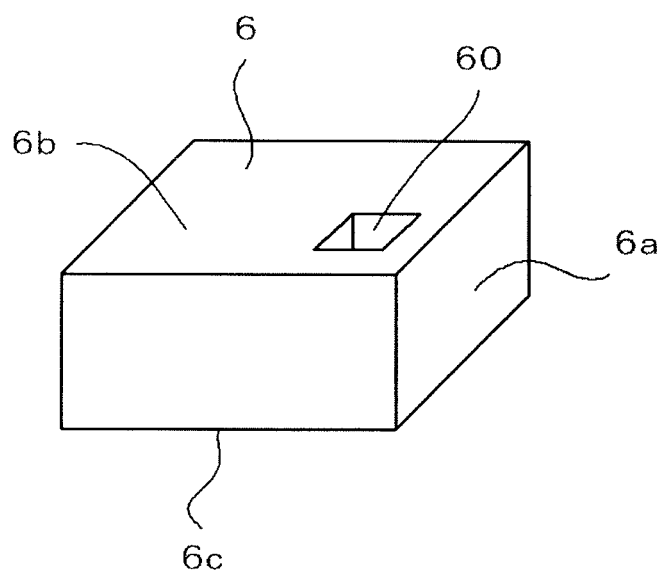
FIG. 26 illustrates a case where machining is started from a machined part of the workpiece.

The detection of the upper and lower surfaces of the workpiece which is performed by the wire-cut electric discharge machine of the present invention is applicable not only to machining from the end surface of the workpiece 6 but also machining which is started from a machined portion of the workpiece 6 as shown in FIG. 26. In this case, an error of a distance between the upper plane surface 6b and the lower plane surface 6c (thickness of the workpiece) of the workpiece 6 is smaller than an error of the length of the end surface of the workpiece 6. Therefore, the error in this case is also ignorable.

Accordingly, in the method for detecting the upper and lower surfaces of the workpiece with the wire-cut electric discharge machine of the present invention in a case where the workpiece 6 is inclined as shown in FIGS. 12 and 18, an extent of contribution of an inclination error of the end surface of a real workpiece is negligible small.

Figure 27A:
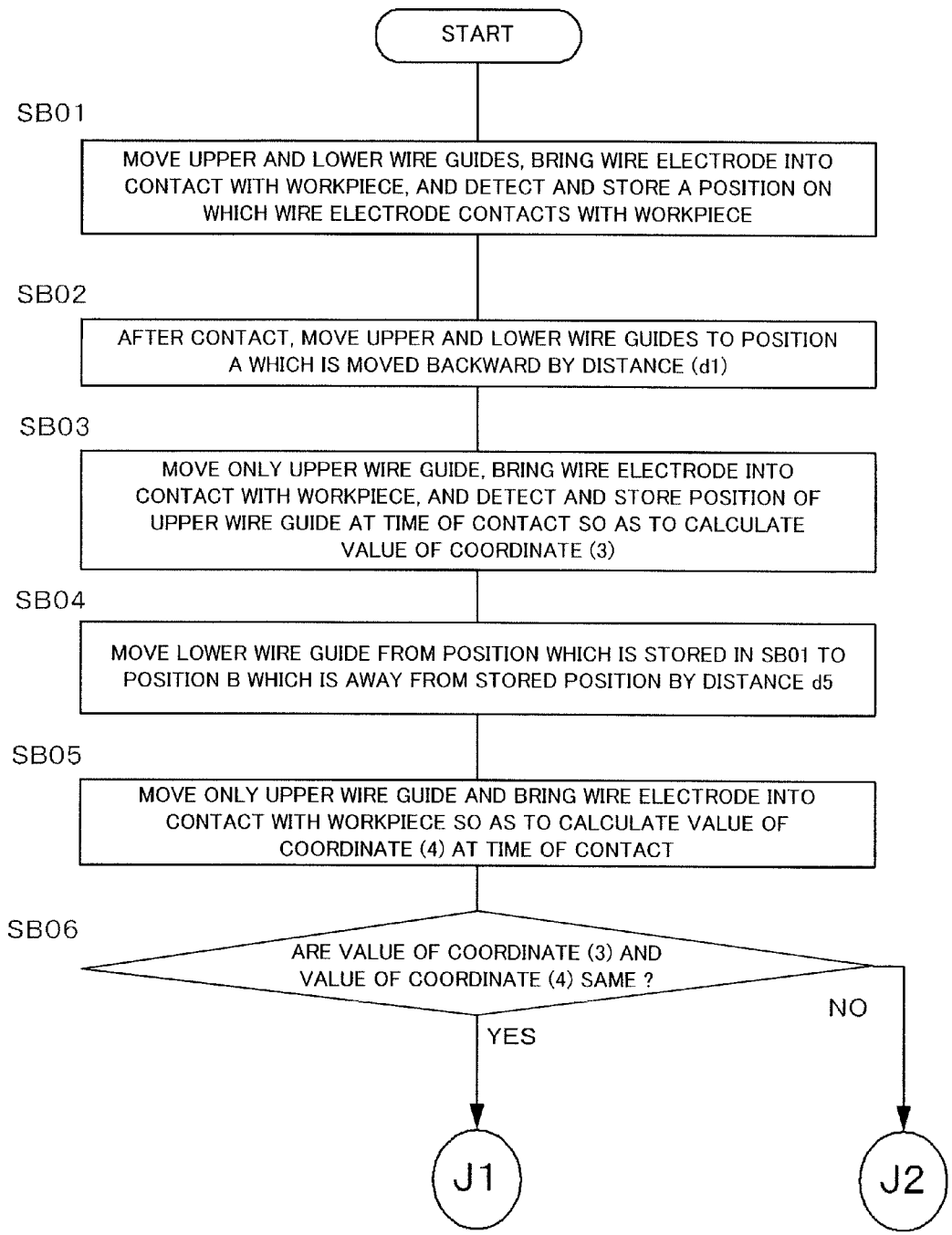
FIGS. 27A and 27B are flowcharts of detection of the upper and lower surfaces of the workpiece.
Figure 27B:
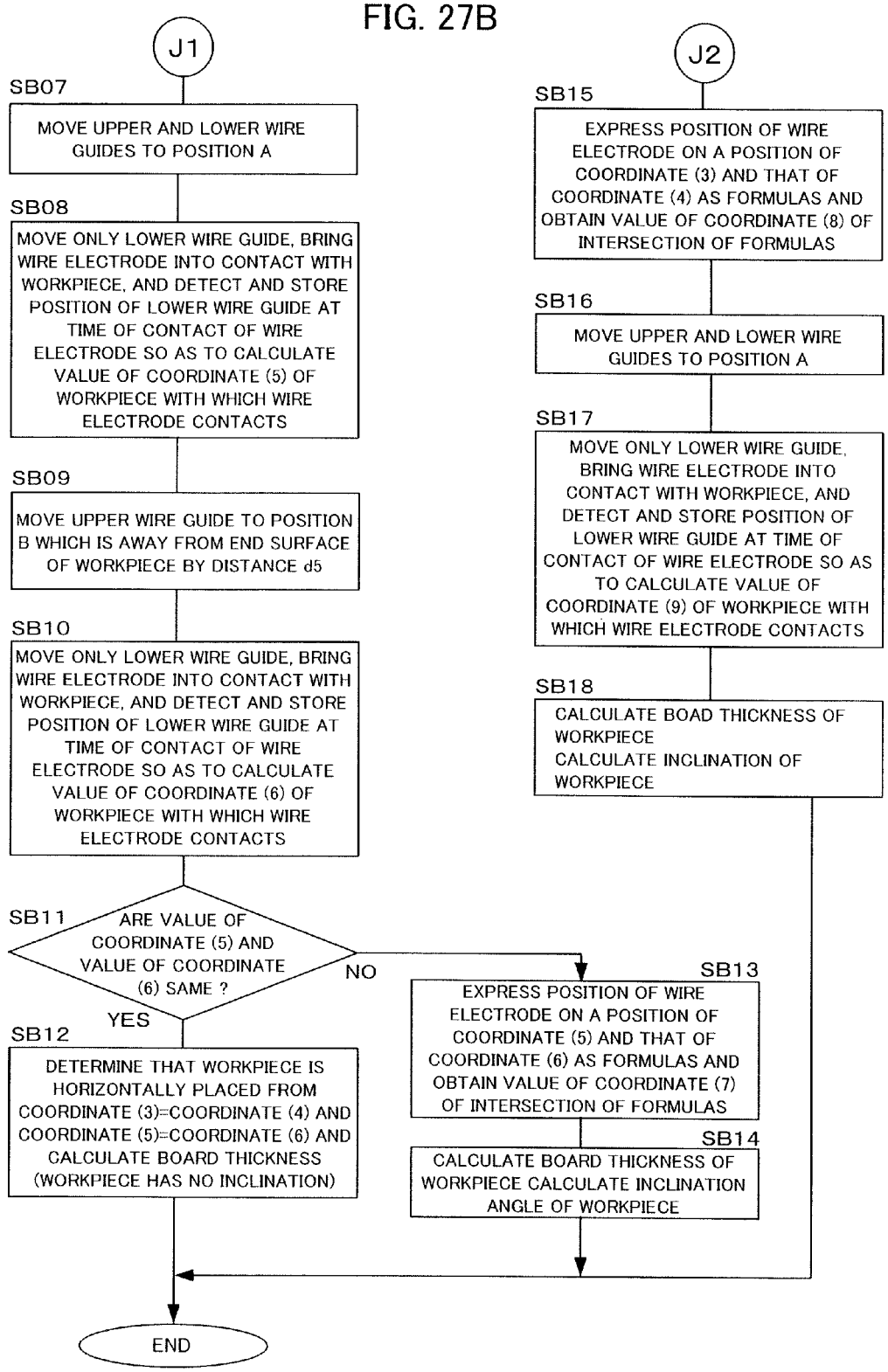

FIGS. 27A and 27B are flowcharts of detection of the upper and lower surfaces of the workpiece. Here, it is assumed that the wire electrode 5 is vertically disposed with respect to the surface, on which the workpiece 6 is placed, of the workpiece placing table 9 with the vertical adjustment function of the wire-cut electric charge machine. The above-described vertical adjustment function is a known technique.

The processing executed at respective steps is described below.

[Step SB01] The upper and lower wire guides are moved and thus the wire electrode is brought into contact with the workpiece so as to detect and store positions of the upper and lower wire guides at a time when the wire electrode contacts with the workpiece.

[Step SB02] After the wire electrode contacts with the workpiece, the upper and lower wire guides are moved to positions (position A) backward by a fixed distance ($d_1$).

[Step SB03] Only the upper wire guide is moved, the wire electrode is brought into contact with the workpiece, and thereby a position of the upper wire guide at a time when the wire electrode contact with the workpiece is detected and stored so as to calculate a value of the coordinate (3) of the workpiece with which the wire electrode contacts.

[Step SB04] The lower wire guide is moved to the position B which is away from the end surface by the distance $d_5$.

[Step SB05] Only the upper wire guide is moved, the wire electrode is brought into contact with the workpiece, and thereby a position of the upper wire guide at a time when the wire electrode contacts with the workpiece is detected and stored so as to calculate a value of the coordinate (4) on the position of the workpiece with which the wire electrode contacts.

[Step SB06] Whether or not the value of the coordinate (3) and the value of the coordinate (4) are the same as each other is determined. When the values are the same as each other, the processing proceeds to step SB07. When the values are not same as each other, the processing proceeds to step SB15.

[Step SB07] The upper and lower wire guides are moved to the position A.

[Step SB08] Only the lower wire guide is moved, the wire electrode is brought into contact with the workpiece, and thereby a position of the lower wire guide at a time when the wire electrode contacts with the workpiece is detected so as to calculate a value of the coordinate (5) on the position of the workpiece with which the wire electrode contacts.

[Step SB09] The upper wire guide is moved to the position B which is away from the end surface of the workpiece by the distance $d_5$.

[Step SB10] Only the lower wire guide is moved, the wire electrode is brought into contact with the workpiece, and thereby a position of the lower wire guide at a time when the wire electrode contacts with the workpiece is detected so as to calculate a value of the coordinate (6) on the position of the workpiece with which the wire electrode contacts.

[Step SB11] Whether the value of the coordinate (5) and the value of the coordinate (6) are same as each other is determined. When the values are same as each other, the processing proceeds to step SB12. When the values are not same as each other, the processing proceeds to step SB13.

[Step SB12] It is determined that the workpiece is horizontally placed from the coordinate (3)=the coordinate (4) and the coordinate (5)=the coordinate (6), and the board thickness is calculated (there is no inclination of the workpiece).

[Step SB13] A position of the wire electrode on the position of the coordinate (5) and a position of the wire electrode on the position of the coordinate (6) are respectively expressed as formulas, and a value of the coordinate (7) of the intersection is obtained.

[Step SB14] Board thickness and an inclination angle of the workpiece are calculated.

[Step SB15] A position of the wire electrode on the position of the coordinate (3) and a position of the wire electrode on the position of the coordinate (4) are respectively expressed as formulas, and a value of the coordinate (8) of the intersection is obtained.

[Step SB16] The upper and lower wire guides are moved to the position A.

[Step SB17] Only the lower wire guide is moved and thus the wire electrode is brought into contact with the workpiece so as to calculate the value of the coordinate (9) at this time.

[Step SB18] Board thickness and an inclination angle of the workpiece are calculated and then this processing is ended.

Figure 28:
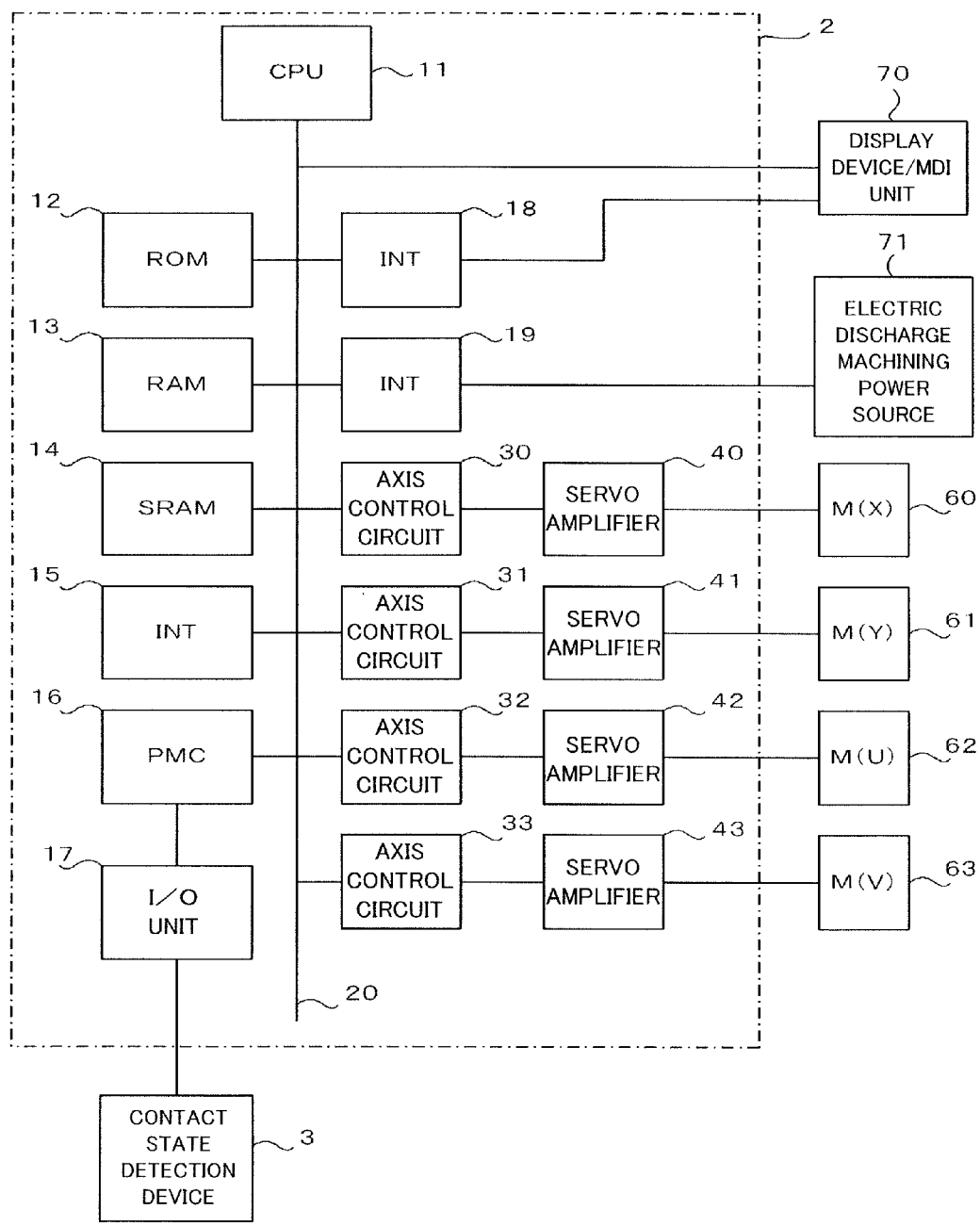
FIG. 28 is a main part block diagram of the wire-cut electric discharge machine according to an embodiment of the present invention.

FIG. 28 is a block diagram of a main part of the wire-cut electric discharge machine according to the embodiment of the present invention.

A processor (CPU) 11 reads out a system program which is stored in a ROM 12 via a bus 20 and controls the whole of the numerical controller 2 in accordance with this system program. A RAM 13 stores temporary calculation data, display data, and the like. A SRAM 14 is configured as a nonvolatile memory of which a storage status is saved even if the numerical controller 2 is turned off.

An interface 15 is an interface for external equipment and is connected with external equipment such as hard disk. A machining program is read from the external equipment and a machining program which is edited within the numerical controller 2 can be outputted to the external equipment.

A programmable machine controller (PMC) 16 controls the wire-cut electric discharge machine by sequence programs installed in the numerical controller 2. That is, a command of the machining program is converted into a signal necessary for the wire-cut electric discharge machine by these sequence programs and the signal is outputted from an I/O unit 17 to the wire-cut electric discharge machine side. Especially, in association with the present invention, the contact state detection device 3 which detects contact between the wire electrode 5 and the workpiece 6 is connected to the I/O unit 17.

A current position of each axis, an alarm, parameters, and an image signal of image data and the like are transmitted to a display device of a display device/MDI unit 70 and are displayed on the display device thereof. An interface 18 receives data from a keyboard of the display device/MDI unit 70 and transmits the data to the CPU 11. An interface 19 is connected with an electric discharge machining power source 71 and receives a speed command from the electric discharge machining power source 71. The electric discharge machining power source 71 monitors an electric discharging state of the wire electrode 5 and the workpiece 6 and informs the speed command including forward movement and backward movement to the CPU 11.

Axis control circuits 30 to 33 receive movement commands of respective axes from the CPU 11 and output the commands of the respective axes to servo amplifiers 40 to 43. These servo amplifiers 40 to 43 receive the commands and drive servo motors 60 to 63 of the respective axes. In each of the servo motors 60 to 63 of respective axes of X, Y, U, and V, a speed detection device (not shown) for detecting a current speed is built in, and a feedback signal from the speed detection device is fed back to the corresponding axis control circuits 30 to 33.

Servo control CPUs respectively built in the axis control circuits 30 to 33 execute respective processing of a position loop, a speed loop, and an electric current loop based on the feedback signals and the above-described movement commands and thus obtain torque commands for final driving control for respective axes so as to control positions and speeds of the servo motors 60 to 63 of the respective axes.

The servo motors 60 and 61 of X and Y axes move the workpiece placing table 9, on which the workpiece 6 is placed, within a two-dimensional plane and the servo motors of U and V axes move the upper wire guide 10a.

The invention claimed is:

1. A wire-cut electric discharge machine having a function of detecting an upper surface of a workpiece, comprising:
   a mechanism configured to relatively move a wire electrode that is stretched between upper and lower wire guides embedded in upper and lower nozzles with respect to a workpiece that is placed on a workpiece placing table;
   a contact detection unit configured to detect contact between the wire electrode and the workpiece;
   a means for controlling relative movement of the wire electrode that is stretched between the upper and lower wire guides with respect to the workpiece after positioning the upper and lower wire guides so that the wire electrode becomes orthogonal to a horizontal surface, then stops the relative movement of the upper and lower wire guides with respect to the workpiece at a first position where contact between the wire electrode and the workpiece is detected, subsequently, relatively moves the upper and lower wire guides with respect to the workpiece, then stops the relative movement of the upper and lower wire guides with respect to the workpiece at a second position that is away from an end surface of the workpiece by a predetermined distance, subsequently, relatively moves the upper wire guide with respect to the workpiece in a state where the lower wire guide is not relatively moved, and then stops the relative movement of the upper wire guide with respect to the workpiece at a third position where the contact between the wire electrode and the workpiece is detected;
   a storage unit configured to store positions of the upper and lower wire guides obtained when the relative movement is stopped on the first position, the second position, and the third position;
   a wire electrode inclination angle calculating unit configured to calculate an inclination angle of the wire electrode lying at the third position from a relative distance in a horizontal direction of the upper wire guide obtained when the relative position of the upper wire guide with respect to the workpiece is changed from the second position to the third position and a distance in a vertical direction of the upper and lower wire guides; and a workpiece upper surface position calculating unit configured to calculate a distance from the lower wire guide to the upper surface of the workpiece based on the inclination angle of the wire electrode lying at the third position and a distance in a horizontal direction between the lower wire guide and the end surface of the workpiece lying at the third position.

2. The wire-cut electric discharge machine according to claim 1, wherein the means for controlling relative movement relatively moves the lower wire guide with respect to the workpiece in a state where the upper wire guide is not relatively moved after positioning the upper and lower wire guides on the second position, and stops the relative movement of the lower wire guide with respect to the workpiece at a fourth position where contact between the wire electrode and the workpiece is detected, the storage unit stores the position of the lower wire guide lying at the fourth position, and the wire electrode inclination angle calculating unit calculates an inclination angle of the wire electrode lying at the fourth position from a relative distance in the horizontal direction obtained when the relative position of the lower wire guide with respect to the workpiece is changed from the second position to the fourth position and a distance in a vertical direction of the upper and lower wire guides, and the wire-cut electric discharge machine further comprises:

a workpiece lower surface position calculating unit configured to obtain a height from the lower wire guide to a lower surface of the workpiece based on an inclination angle of the wire electrode lying at the fourth position and a distance in a horizontal direction between the lower wire guide lying at the fourth position and the end surface of the workpiece; and a board thickness calculating unit configured to calculate board thickness of the workpiece from a height from the lower wire guide to the upper surface of the workpiece and a height from the lower wire guide to the lower surface of the workpiece.

3. The wire-cut electric discharge machine according to claim 1, further comprising:

an upper nozzle positioning unit configured to position the upper nozzle so that a distance between the upper nozzle and the upper surface of the workpiece becomes a predetermined distance.

* * * * *